(12) United States Patent
Watanabe

(10) Patent No.: US 11,376,477 B2
(45) Date of Patent: *Jul. 5, 2022

(54) MULTI-PIECE SOLID GOLF BALL

(71) Applicant: Bridgestone Sports Co., Ltd., Tokyo (JP)

(72) Inventor: Hideo Watanabe, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,494

(22) Filed: Aug. 4, 2021

(65) Prior Publication Data

US 2022/0062712 A1   Mar. 3, 2022

(30) Foreign Application Priority Data

Aug. 31, 2020 (JP) .............................. JP2020-145497
Mar. 15, 2021 (JP) .............................. JP2021-041168

(51) Int. Cl.
| | | |
|---|---|---|
| *A63B 37/06* | (2006.01) | |
| *A63B 37/00* | (2006.01) | |
| *C09D 175/06* | (2006.01) | |
| *C08L 9/00* | (2006.01) | |

(52) U.S. Cl.
CPC ...... *A63B 37/0076* (2013.01); *A63B 37/0043* (2013.01); *A63B 37/0063* (2013.01); *A63B 37/0064* (2013.01); *A63B 37/0087* (2013.01); *A63B 37/0092* (2013.01); *C08L 9/00* (2013.01); *C09D 175/06* (2013.01)

(58) Field of Classification Search
CPC .................. A63B 37/0076; A63B 37/0063

USPC ........................................................ 473/376
See application file for complete search history.

(56) References Cited

U.S. PATENT DOCUMENTS

| 11,179,606 B1 * | 11/2021 | Watanabe ............ A63B 37/0064 |
| 2006/0270492 A1 | 11/2006 | Higuchi et al. |
| 2007/0281802 A1 | 12/2007 | Watanabe et al. |
| 2007/0287557 A1 | 12/2007 | Watanabe et al. |
| 2008/0102987 A1 | 5/2008 | Watanabe et al. |

(Continued)

FOREIGN PATENT DOCUMENTS

| JP | 2006-326301 A | 12/2006 |
| JP | 2007-319667 A | 12/2007 |

(Continued)

*Primary Examiner* — Raeann Gorden
(74) *Attorney, Agent, or Firm* — Sughrue Mion, PLLC

(57) ABSTRACT

In a golf ball having a core, envelope layer, intermediate layer and cover, the core has a specific hardness profile, the resin materials making up either or both of the envelope layer and the intermediate layer contain a high-acid ionomer, and the Shore C hardness relationships among the core center, surface of the envelope-encased layer and surface of the intermediate layer-encased sphere satisfy the following conditions:

surface hardness of envelope layer-encased sphere<surface hardness of intermediate layer-encased sphere,   (1)

surface hardness of intermediate layer-encased sphere−center hardness of core≥40.   (2)

This ball achieves a good distance on shots with utility and iron clubs, is receptive to spin in the short game, and has a soft feel at impact on all shots, making it useful to amateur golfers.

10 Claims, 3 Drawing Sheets

(56) References Cited

U.S. PATENT DOCUMENTS

| | | |
|---|---|---|
| 2008/0146376 A1 | 6/2008 | Watanabe |
| 2009/0036232 A1 | 2/2009 | Nanba et al. |
| 2009/0036236 A1 | 2/2009 | Nanba et al. |
| 2016/0151677 A1 | 6/2016 | Watanabe et al. |
| 2016/0151679 A1 | 6/2016 | Watanabe |
| 2016/0175661 A1 | 6/2016 | Watanabe et al. |

FOREIGN PATENT DOCUMENTS

| | | |
|---|---|---|
| JP | 2007-330789 A | 12/2007 |
| JP | 2008-068077 A | 3/2008 |
| JP | 2008-149131 A | 7/2008 |
| JP | 2009-034507 A | 2/2009 |
| JP | 2009-095358 A | 5/2009 |
| JP | 2009-095364 A | 5/2009 |
| JP | 2009-095365 A | 5/2009 |
| JP | 2009-095369 A | 5/2009 |
| JP | 2012-071163 A | 4/2012 |
| JP | 2016-101254 A | 6/2016 |
| JP | 2016-101256 A | 6/2016 |
| JP | 2016-116627 A | 6/2016 |

* cited by examiner

MULTI-PIECE SOLID GOLF BALL

CROSS-REFERENCE TO RELATED APPLICATION

This non-provisional application claims priority under 35 U.S.C. § 119(a) on Patent Application Nos. 2020-145497 and 2021-041168 filed in Japan on Aug. 31, 2020, and Mar. 15, 2021, respectively, the entire contents of which are hereby incorporated by reference.

TECHNICAL FIELD

The present invention relates to a multi-piece solid golf ball composed of four or more layers that include a core, an envelope layer, an intermediate layer and a cover.

BACKGROUND ART

Many innovations have been made in designing golf balls with a multilayer construction, and numerous balls that satisfy the needs of not only professional golfers, but also skilled and mid-level amateur golfers, have been developed to date. For example, functional multi-piece solid golf balls in which the surface hardnesses of the respective layers—i.e., the core, envelope layer, intermediate layer and cover (outermost layer)—have been optimized are in wide use. Also, a number of technical disclosures have been published that focus on the hardness profile of the core which accounts for most of the ball volume and, by creating various core interior hardness designs, provide high-performance golf balls for professional golfers and mid-level to skilled amateur golfers.

Examples of such literature include JP-A 2006-326301, JP-A 2007-319667, JP-A 2007-330789, JP-A 2008-068077, JP-A 2008-149131, JP-A 2009-034507, JP-A 2009-095358, JP-A 2009-095364, JP-A 2009-095365, JP-A 2009-095369, JP-A 2012-071163, JP-A 2016-101254, JP-A 2016-101256 and JP-A 2016-116627. These disclosures, all of which relate to golf balls having a multilayer construction of four or more layers, focus on, for example, the surface hardnesses of the respective layers—namely, the core, the envelope layer, the intermediate layer and the cover (outermost layer), the relationship between the ball diameter and the core diameter, and the core hardness profile.

However, there remains room for improvement in optimizing the hardness profile of the core and the thickness relationship among the layers in these prior-art golf balls. That is, when these golf balls are played by amateur golfers whose head speeds are not high, a fully satisfactory distance cannot be achieved, particularly on full shots with a utility club or an iron. Moreover, with some of these prior-art golf balls, on striving to achieve a superior distance performance even on iron shots, a sufficiently high spin rate on approach shots cannot be obtained, resulting in a ball that lacks a high playability or that has a poor feel at impact on full shots. Accordingly, there exists a desire for the development of a golf ball for amateur golfers which has an improved distance on full shots with a utility club or an iron, has a soft and good feel on all full shots, and moreover has a high playability in the short game.

SUMMARY OF THE INVENTION

It is therefore an object of the present invention to provide a golf ball which, as a ball for amateur golfers, achieves a superior distance on full shots with a utility club or an iron, has an excellent spin performance on approach shots and is thus optimal in the short game, and moreover has a soft and good feel on all shots.

As a result of extensive investigations, I have discovered that, in a golf ball having a core, an envelope layer, an intermediate layer and a cover, certain desirable effects can be achieved by forming the cover so as to be soft using preferably a urethane resin material as the cover material, by forming the envelope layer and the intermediate layer such that the envelope layer is softer than the intermediate layer and so as to include a high-acid ionomer in the resin material making up the envelope layer, the intermediate layer or both, and by, in the core hardness profile and hardness gradient designs, determining point-to-point hardness gradients at positions spaced 2 mm apart inward and outward from the core radius midpoint and optimizing these hardness gradients for the overall core. That is, the spin rate on full shots can be held down more than in conventional golf balls, resulting in an improved distance. In particular, a good distance can be achieved on full shots with utility clubs and irons. Also, the ball is receptive to spin in the short game and a soft feel at impact can be imparted, in addition to which the ball has a good durability to repeated impact. I have thus arrived at a superior golf ball which, for the amateur golfer whose head speed is not high, can achieve an excellent distance even on full shots with utility clubs and irons, and for which the spin performance on approach shots can be maintained at a high level.

Accordingly, in a first aspect, the invention provides a multi-piece solid golf ball having a core, an envelope layer, an intermediate layer and a cover, the core being formed of a rubber composition as one layer, the envelope layer being formed of a resin material as one or more layers and the intermediate layer and cover each independently being formed of a resin material as a single layer. In the golf ball of the invention, the core has a diameter of from 35.1 to 41.3 mm and has a hardness profile in which, letting $Cc$ be the Shore C hardness at a center of the core, $Cm$ be the Shore C hardness at a midpoint M between the core center and a surface of the core, $Cm-2$, $Cm-4$ and $Cm-6$ be the respective Shore C hardnesses at positions 2 mm, 4 mm and 6 mm inward from the midpoint M, $Cm+2$, $Cm+4$ and $Cm+6$ be the respective Shore C hardnesses at positions 2 mm, 4 mm and 6 mm outward from the midpoint M and $Cs$ be the Shore C hardness at the core surface, and defining the surface areas A to F as follows surface area $A: \frac{1}{2} \times 2 \times (Cm-4-Cm-6)$ surface area $B: \frac{1}{2} \times 2 \times (Cm-2-Cm-4)$ surface area $C: \frac{1}{2} \times 2 \times (Cm-Cm-2)$ surface area $D: \frac{1}{2} \times 2 \times (Cm+2-Cm)$ surface area $E: \frac{1}{2} \times 2 \times (Cm+4-Cm+2)$ surface area $F: \frac{1}{2} \times 2 \times (Cm+6-Cm+4)$, (surface area E+surface area F)−(surface area A+surface area B) has a value of 1.0 or more and surface area A<surface area C<(surface area E+surface area F). Also, the resin materials making up either or both of the envelope layer and the intermediate layer contain a high-acid ionomer; and the center hardness of the core, surface hardness of the sphere obtained by encasing the core with the envelope layer (envelope layer-encased sphere) and surface hardness of the sphere obtained by encasing the envelope layer-encased sphere with the intermediate layer (intermediate layer-encased sphere) have Shore C hardness relationships therebetween which satisfy the following conditions:

surface hardness of envelope layer-encased sphere<surface hardness of intermediate layer-encased sphere, and (1)

(surface hardness of intermediate layer-encased sphere)−(center hardness of core)≥40. (2)

In addition, the ball has a deflection when compressed under a final load of 1,275 N (130 kgf) from an initial load of 98 N (10 kgf) which is at least 2.7 mm.

In a preferred embodiment of the golf ball according to the first aspect of the invention, the thickness relationship among the layers satisfies the following condition:

cover thickness<intermediate layer thickness<envelope layer thickness. (3)

In another preferred embodiment of the inventive golf ball, the surface hardnesses of the core and the layer-encased spheres satisfy the following condition:

surface hardness of core<surface hardness of envelope layer-encased sphere<surface hardness of intermediate layer-encased sphere>surface hardness of ball. (1')

In yet another preferred embodiment, the intermediate layer has a material hardness on the Shore D hardness scale of at least 64.

In still another preferred embodiment, the value of (surface hardness of intermediate layer-encased sphere)−(center hardness of core) in formula (2) has an upper limit on the Shore C hardness scale of 53 or less.

In a further preferred embodiment, the envelope layer is a single layer.

In a still further preferred embodiment, the value obtained by subtracting the core center hardness (Cc) from the core surface hardness (Cs), expressed as Cs−Cc, is 20 or more.

In another preferred embodiment, surface areas B to E in the core hardness profile satisfy the following condition:

(surface area $D$+surface area $E$)−(surface area $B$+surface area $C$)≥1.0.

In yet another preferred embodiment, the resin material making up the intermediate layer contains a high-acid ionomer.

In a second aspect, the present invention provides a multi-piece solid golf ball having a core, an envelope layer, an intermediate layer and a cover, the core being formed of a rubber composition as one layer, the envelope layer being formed of a resin material as one or more layers and the intermediate layer and cover each independently being formed of a resin material as a single layer. In the golf ball according to this second aspect of the invention, the core has a diameter of from 35.1 to 41.3 mm and has a hardness profile in which, letting Cc be the Shore C hardness at a center of the core, Cm be the Shore C hardness at a midpoint M between the core center and a surface of the core, Cm−2, Cm−4 and Cm−6 be the respective Shore C hardnesses at positions 2 mm, 4 mm and 6 mm inward from the midpoint M, Cm+2, Cm+4 and Cm+6 be the respective Shore C hardnesses at positions 2 mm, 4 mm and 6 mm outward from the midpoint M and Cs be the Shore C hardness at the core surface, and defining the surface areas A to F as follows surface area $A$:½×2×($Cm-4-Cm-6$)

surface area $B$:½×2×($Cm-2-Cm-4$)

surface area $C$:½×2×($Cm-Cm-2$)

surface area $D$:½×2×($Cm+2-Cm$)

surface area $E$:½×2×($Cm+4-Cm+2$)

surface area $F$:½×2×($Cm+6-Cm+4$), (surface area E+surface area F)−(surface area A+surface area B) has a value of 1.0 or more and surface area A<surface area C<(surface area E+surface area F). Also, the intermediate layer has a material hardness on the Shore D hardness scale of at least 65; and the center hardness of the core, surface hardness of the sphere obtained by encasing the core with the envelope layer (envelope layer-encased sphere) and surface hardness of the sphere obtained by encasing the envelope layer-encased sphere with the intermediate layer (intermediate layer-encased sphere) have Shore C hardness relationships therebetween which satisfy the following conditions:

surface hardness of envelope layer-encased sphere<surface hardness of intermediate layer-encased sphere, and (1)

(surface hardness of intermediate layer-encased sphere)−(center hardness of core)≥40. (2)

In addition, the ball has a deflection when compressed under a final load of 1,275 N (130 kgf) from an initial load of 98 N (10 kgf) which is at least 2.7 mm.

Advantageous Effects of the Invention

The multi-piece solid golf ball of the invention achieves a good distance on shots with utility and iron clubs, is receptive to spin in the short game, and moreover has a soft feel at impact on all shots. In addition, it also has an excellent durability to repeated impact. These qualities make it particularly useful as a golf ball for amateur golfers.

BRIEF DESCRIPTION OF THE DIAGRAMS

DESCRIPTION OF THE PREFERRED EMBODIMENTS

The objects, features and advantages of the invention will become more apparent from the following detailed description taken in conjunction with the appended diagrams.

Figure 1:
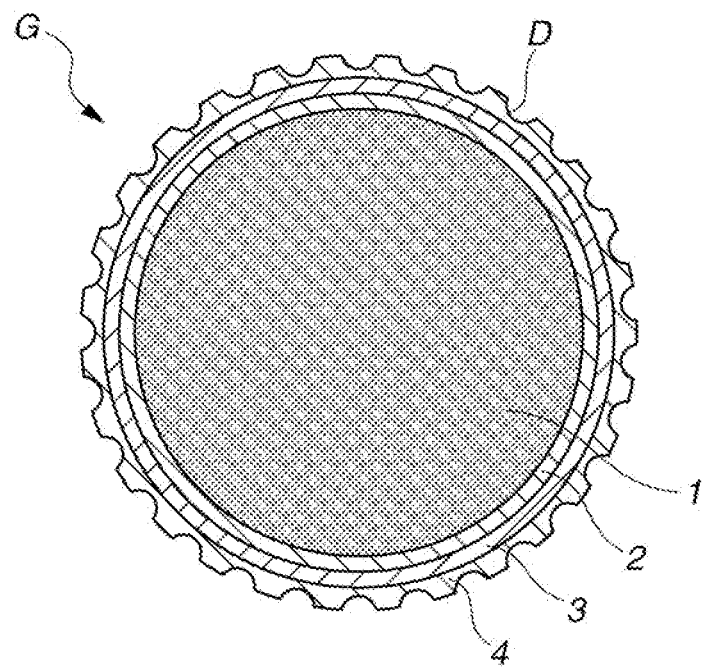
FIG. 1 is a schematic cross-sectional view of the multi-piece solid golf ball according to the invention.

The multi-piece solid golf ball of the invention has a core, an envelope layer, an intermediate layer and a cover. Referring to FIG. 1, which shows an embodiment of the inventive golf ball, the ball G has a core 1, an envelope layer 2 encasing the core 1, an intermediate layer 3 encasing the envelope layer 2, and a cover 4 encasing the intermediate layer 3. The cover 4 is positioned as the outermost layer, apart from a coating layer, in the layered construction of the ball. In this invention, the envelope layer may be a single layer or may be formed as two or more layers. Numerous dimples D are typically formed on the surface of the cover (outermost layer) 4 to enhance the aerodynamic properties of the ball. Although not shown in the diagrams, a coating layer 5 is generally formed on the surface of the cover 4. Each layer is described in detail below.

The core is composed primarily of a rubber material. Specifically, a core-forming rubber composition can be prepared by using a base rubber as the chief component and including together with this other ingredients such as a co-crosslinking agent, an organic peroxide, an inert filler and an organosulfur compound. It is preferable to use polybutadiene as the base rubber.

Commercial products may be used as the polybutadiene. Illustrative examples include BR01, BR51 and BR730 (from JSR Corporation). The proportion of polybutadiene within the base rubber is preferably at least 60 wt %, and more preferably at least 80 wt %. Rubber ingredients other than the above polybutadienes may be included in the base rubber, provided that doing so does not detract from the advantageous effects of the invention. Examples of rubber ingredients other than the above polybutadienes include other polybutadienes and also other diene rubbers, such as styrene-butadiene rubbers, natural rubbers, isoprene rubbers and ethylene-propylene-diene rubbers.

Examples of co-crosslinking agents include unsaturated carboxylic acids and the metal salts of unsaturated carboxylic acids. Specific examples of unsaturated carboxylic acids include acrylic acid, methacrylic acid, maleic acid and fumaric acid. The use of acrylic acid or methacrylic acid is especially preferred. Metal salts of unsaturated carboxylic acids include, without particular limitation, the above unsaturated carboxylic acids that have been neutralized with desired metal ions. Specific examples include the zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, which is typically at least 5 parts by weight, preferably at least 9 parts by weight, and more preferably at least 13 parts by weight. The amount included is typically not more than 60 parts by weight, preferably not more than 50 parts by weight, and more preferably not more than 40 parts by weight. Too much may make the core too hard, giving the ball an unpleasant feel at impact, whereas too little may lower the rebound.

Commercial products may be used as the organic peroxide. Examples of such products that may be suitably used include Percumyl D, Perhexa C-40 and Perhexa 3M (all from NOF Corporation), and Luperco 231XL (from Ato-Chem Co.). One of these may be used alone, or two or more may be used together. The amount of organic peroxide included per 100 parts by weight of the base rubber is preferably at least 0.1 part by weight, more preferably at least 0.3 part by weight, and even more preferably at least 0.5 part by weight. The upper limit is preferably not more than 5 parts by weight, more preferably not more than 4 parts by weight, even more preferably not more than 3 parts by weight, and most preferably not more than 2.5 parts by weight. When too much or too little is included, it may not be possible to obtain a ball having a good feel, durability and rebound.

Another compounding ingredient typically included with the base rubber is an inert filler, preferred examples of which include zinc oxide, barium sulfate and calcium carbonate. One of these may be used alone, or two or more may be used together. The amount of inert filler included per 100 parts by weight of the base rubber is preferably at least 1 part by weight, and more preferably at least 5 parts by weight. The upper limit is preferably not more than 50 parts by weight, more preferably not more than 40 parts by weight, and even more preferably not more than 36 parts by weight. Too much or too little inert filler may make it impossible to obtain a proper weight and a suitable rebound.

In addition, an antioxidant may be optionally included. Illustrative examples of suitable commercial antioxidants include Nocrac NS-6 and Nocrac NS-30 (both available from Ouchi Shinko Chemical Industry Co., Ltd.), and Yoshinox 425 (available from Yoshitomi Pharmaceutical Industries, Ltd.). One of these may be used alone, or two or more may be used together.

The amount of antioxidant included per 100 parts by weight of the base rubber is set to preferably 0 part by weight or more, more preferably at least 0.05 part by weight, and even more preferably at least 0.1 part by weight. The upper limit is set to preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable ball rebound and durability.

An organosulfur compound may be included in the core in order to impart a good resilience. The organosulfur compound is not particularly limited, provided that it can enhance the rebound of the golf ball. Exemplary organosulfur compounds include thiophenols, thionaphthols, halogenated thiophenols, and metal salts of these. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, and any of the following having 2 to 4 sulfur atoms: diphenylpolysulfides, dibenzylpolysulfides, dibenzoylpolysulfides, dibenzothiazoylpolysulfides and dithiobenzoylpolysulfides. The use of the zinc salt of pentachlorothiophenol is especially preferred.

It is recommended that the amount of organosulfur compound included per 100 parts by weight of the base rubber be preferably 0 part by weight or more, more preferably at least 0.05 part by weight, and even more preferably at least 0.1 part by weight, and that the upper limit be preferably not more than 5 parts by weight, more preferably not more than 3 parts by weight, and even more preferably not more than 2.5 parts by weight. Including too much organosulfur compound may make a greater rebound-improving effect (particularly on shots with a W #1) unlikely to be obtained, may make the core too soft or may worsen the feel of the ball at impact. On the other hand, including too little may make a rebound-improving effect unlikely.

Decomposition of the organic peroxide within the core formulation can be promoted by the direct addition of water (or a water-containing material) to the core material. The decomposition efficiency of the organic peroxide within the core-forming rubber composition is known to change with temperature; starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature. In cases where water (or a water-containing material) is added directly to the core, because the water acts to promote decomposition of the organic peroxide, radical reactions like those described above can be made to differ at the core center and core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and the core surface differ markedly. It is also possible to obtain a core having different dynamic viscoelastic properties at the core center.

The water included in the core material is not particularly limited, and may be distilled water or tap water. The use of distilled water that is free of impurities is especially preferred. The amount of water included per 100 parts by weight of the base rubber is preferably at least 0.1 part by weight, and more preferably at least 0.3 part by weight. The upper limit is preferably not more than 5 parts by weight, and more preferably not more than 4 parts by weight.

The core can be produced by vulcanizing and curing the rubber composition containing the above ingredients. For example, the core can be produced by using a Banbury mixer, roll mill or other mixing apparatus to intensively mix the rubber composition, subsequently compression molding or injection molding the mixture in a core mold, and curing the resulting molded body by suitably heating it under conditions sufficient to allow the organic peroxide or co-crosslinking agent to act, such as at a temperature of between 100 and 200° C., preferably between 140 and 180° C., for 10 to 40 minutes.

The core is formed as a single layer.

The core has a diameter of from 35.1 to 41.3 mm, the lower limit being preferably at least 35.3 mm, more preferably at least 35.4 mm, and the upper limit being preferably not more than 39.2 mm, more preferably not more than 38.3 mm. When the core diameter is too small, the initial velocity of the ball becomes low or the deflection hardness of the overall ball becomes high, as a result of which the spin rate on full shots rises and the intended distance cannot be attained. On the other hand, when the core diameter is too large, the spin rate on full shots rises and the intended distance cannot be attained, or the durability to cracking on repeated impact worsens.

The core has a deflection (mm) when compressed under a final load of 1,275 N (130 kgf) from an initial load of 98 N (10 kgf) which, although not particularly limited, is preferably at least 3.6 mm, more preferably at least 3.8 mm, and even more preferably at least 4.0 mm. The upper limit is preferably not more than 6.0 mm, more preferably not more than 5.7 mm, and even more preferably not more than 5.4 mm. When the core deflection is too small, i.e., when the core is too hard, the spin rate of the ball may rise excessively and a good distance may not be achieved, or the feel at impact may be too hard. On the other hand, when the core deflection is too large, i.e., when the core is too soft, the ball rebound may become too low and a good distance may not be achieved, the feel at impact may be too soft, or the durability to cracking on repeated impact may worsen.

Next, the hardness profile of the core is described. The core hardness described below refers to the Shore C hardness. This Shore C hardness is the hardness value measured with a Shore C durometer in accordance with ASTM D2240.

The core center hardness Cc, although not particularly limited, may be set to preferably at least 45, more preferably at least 47, and even more preferably at least 48. The upper limit also is not particularly limited, but may be set to preferably not more than 61, more preferably not more than 59, and even more preferably not more than 57. When this value is too large, the spin rate may rise, as a result of which the desired distance may not be attainable, or the feel at impact may become too hard. On the other hand, when this value is too small, the rebound may become low, as a result of which the desired distance may not be attainable, or the durability to cracking on repeated impact may worsen.

The hardness Cm−6 at a position 6 mm inward from the position M located midway between the center and surface of the core (also referred to below as the "midpoint M"), although not particularly limited, may be set to preferably at least 45, more preferably at least 47, and even more preferably at least 49. The upper limit also is not particularly limited, but may be set to preferably not more than 61, more preferably not more than 59, and even more preferably not more than 57. Hardnesses that deviate from these values may lead to undesirable results similar to those described above for the core center hardness (Cc).

The hardness Cm−4 at a position 4 mm inward toward the core center (indicated below as simply "inward") from the midpoint M of the core, although not particularly limited, may be set to preferably at least 48, more preferably at least 50, and even more preferably at least 52. The upper limit also is not particularly limited, but may be set to preferably not more than 62, more preferably not more than 60, and even more preferably not more than 58. Hardnesses that deviate from these values may lead to undesirable results similar to those described above for the core center hardness (Cc).

The hardness Cm−2 at a position 2 mm inward from the midpoint M of the core, although not particularly limited, may be set to preferably at least 50, more preferably at least 52, and even more preferably at least 54. The upper limit also is not particularly limited, but may be set to preferably not more than 64, more preferably not more than 62, and even more preferably not more than 60. Hardnesses that deviate from these values may lead to undesirable results similar to those described above for the core center hardness (Cc).

The cross-sectional hardness Cm at the midpoint M of the core, although not particularly limited, may be set to preferably at least 54, more preferably at least 56, and even more preferably at least 58. The upper limit also is not particularly limited, but may be set to preferably not more than 68, more preferably not more than 66, and even more preferably not more than 64. Hardnesses that deviate from these values may lead to undesirable results similar to those described above for the core center hardness (Cc).

The hardness Cm+2 at a position 2 mm outward toward the core center (indicated below as simply "outward") from the midpoint M of the core, although not particularly limited, may be set to preferably at least 57, more preferably at least 60, and even more preferably at least 62. The upper limit also is not particularly limited, but may be set to preferably not more than 74, more preferably not more than 71, and even more preferably not more than 69. When this value is too large, the durability to cracking on repeated impact may worsen, or the feel at impact may become too hard. On the other hand, when this value is too small, the rebound may become low or the spin rate on full shots may rise, as a result of which the intended distance may not be attainable.

The hardness Cm+4 at a position 4 mm outward from the midpoint M of the core, although not particularly limited, may be set to preferably at least 62, more preferably at least 64, and even more preferably at least 66. The upper limit also is not particularly limited, but may be set to preferably not more than 77, more preferably not more than 76, and even more preferably not more than 74. Hardnesses that deviate from these values may lead to undesirable results similar to those described above for the hardness at a position 2 mm from the midpoint M of the core (Cm+2).

The hardness Cm+6 at a position 6 mm outward from the midpoint M of the core, although not particularly limited, may be set to preferably at least 63, more preferably at least 65, and even more preferably at least 67. The upper limit also is not particularly limited, but may be set to preferably not more than 81, more preferably not more than 79, and even more preferably not more than 77. Hardnesses that deviate from these values may lead to undesirable results similar to those described above for the hardness at a position 2 mm from the midpoint M of the core (Cm+2).

The core surface hardness Cs, although not particularly limited, may be set to preferably at least 69, more preferably at least 71, and even more preferably at least 73. The upper limit also is not particularly limited, but may be set to preferably not more than 87, more preferably not more than 85, and even more preferably not more than 83. When this value is too large, the durability to cracking on repeated impact may worsen or the feel at impact may become too hard. On the other hand, when this value is too small, the rebound may become too low or the spin rate on full shots may rise, as a result of which the intended distance may not be attainable.

The hardness difference between the core center and core surface is optimized so as to make the hardness difference between the core interior and the core exterior large. That is, the Shore C hardness value obtained by subtracting the core center hardness (Cc) from the core surface hardness (Cs), expressed as Cs−Cc, is set to preferably at least 20, more preferably at least 22, and even more preferably at least 24. Although there is no particular upper limit, this value is preferably not more than 35, more preferably not more than 30, and even more preferably not more than 28. When this hardness difference is too small, the spin rate on full shots may rise, as a result of which the intended distance may not be attained. On the other hand, when this hardness difference is too large, the durability to cracking on repeated impact may worsen or the initial velocity on shots may become lower, as a result of which the intended distance may not be attainable. As used herein, the core center hardness Cc refers to the hardness measured at the center of the cross-section obtained by cutting the core in half through the center, and the core surface hardness Cs refers to the hardness measured at the spherical surface of the core.

Figure 2:
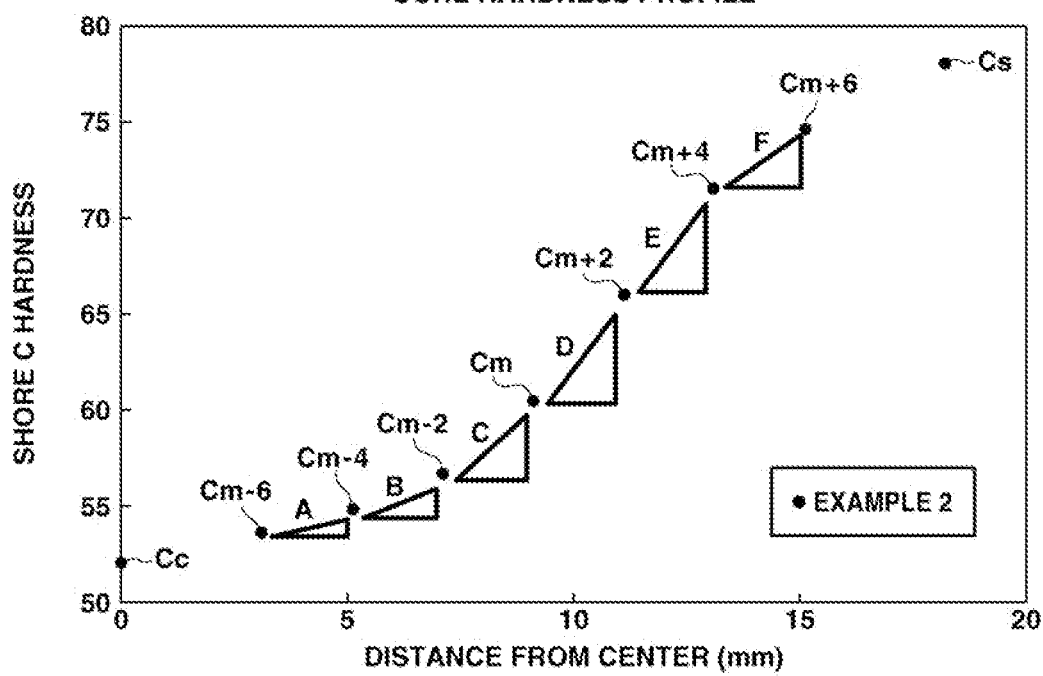
FIG. 2 is a graph that uses core hardness profile data from Example 2 to explain surface areas A to F in the core hardness profile.

In the above-described core hardness profile in this invention, the surface areas A to F defined as follows:

surface area $A: \frac{1}{2} \times 2 \times (Cm-4-Cm-6)$ surface area $B: \frac{1}{2} \times 2 \times (Cm-2-Cm-4)$ surface area $C: \frac{1}{2} \times 2 \times (Cm-Cm-2)$ surface area $D: \frac{1}{2} \times 2 \times (Cm+2-Cm)$ surface area $E: \frac{1}{2} \times 2 \times (Cm+4-Cm+2)$ surface area $F: \frac{1}{2} \times 2 \times (Cm+6-Cm+4)$, are characterized in that the value of (surface area E+surface area F)−(surface area A+surface area B) is 1.0 or more. The value of (surface area E+surface area F)−(surface area A+surface area B) is preferably 2.0 or more, and more preferably 4.0 or more. The upper limit value is preferably not more than 20.0, more preferably not more than 16.0, and even more preferably not more than 12.0. When this value is too large, the durability to cracking under repeated impact may worsen. On the other hand, when this value is too small, the spin rate on full shots rises and the intended distance cannot be attained. FIG. 2 shows a graph that uses core hardness profile data from Example 2 to explain surface areas A to F. As is apparent from the graph, each of surface areas A to F is the surface area of a triangle whose base is the difference between specific distances and whose height is the difference in hardness between the positions at these specific distances.

Surface areas B to E are such that the value of (surface area D+surface area E)−(surface area B+surface area C), although not particularly limited, is preferably 1.0 or more, more preferably 2.0 or more, and even more preferably 4.0 or more. The upper limit value is preferably not more than 20.0, more preferably not more than 16.0, and even more preferably not more than 12.0. When this value is too large, the durability to cracking on repeated impact may worsen. On the other hand, when this value is too small, the spin rate on full shots may rise and the intended distance may not be attainable.

Surface areas A to F in the above core hardness profile satisfy the condition:

surface area $A$<surface area $C$<(surface area $E$+surface area $F$), preferably satisfy the condition:

surface area $A$<surface area $B$<surface area $C$<(surface area $E$+surface area $F$), and more preferably satisfy the condition:

surface area $A$<surface area $B$<surface area $C$<surface area $D$<(surface area $E$+surface area $F$).

When these relationships are not satisfied, the spin rate on full shots with a utility club or an iron may rise and the intended distance may not be attainable.

Next, the envelope layer is described.

The envelope layer has a material hardness on the Shore D scale which, although not particularly limited, is preferably at least 47, more preferably at least 49, and even more preferably at least 51. The upper limit is preferably not more than 62, more preferably not more than 60, and even more preferably not more than 57. The surface hardness of the sphere obtained by encasing the core with the envelope layer (envelope layer-encased sphere), expressed on the Shore D scale, is preferably at least 53, more preferably at least 55, and even more preferably at least 57. The upper limit is preferably not more than 68, more preferably not more than 66, and even more preferably not more than 63. When these material and surface hardnesses of the envelope layer are lower than the above ranges, the ball may be too receptive to spin on full shots or the initial velocity may be low, which may result in a poor distance. On the other hand, when these material and surface hardnesses are too high, the feel at impact may be too hard, the durability to cracking on repeated impact may worsen, or the spin rate on full shots with a utility club or an iron may rise, which may result in a poor distance.

The surface hardness of the envelope layer-encased sphere is set lower than the surface hardness of the intermediate layer-encased sphere. When the envelope layer-encased sphere has a higher surface hardness than the intermediate layer-encased sphere, the spin rate on full shots rises and a good distance cannot be achieved, or the feel at impact is poor.

The material hardness of the envelope layer, expressed on the Shore C scale, is preferably at least 72, more preferably at least 75, and even more preferably at least 78. The upper limit value is preferably not more than 92, more preferably not more than 90, and even more preferably not more than 88. The surface hardness of the envelope layer-encased sphere, expressed on the Shore C scale, is preferably at least 80, more preferably at least 83, and even more preferably at least 86. The upper limit value is preferably not more than 97, more preferably not more than 95, and even more preferably not more than 93.

The envelope layer has a thickness which is preferably at least 0.8 mm, more preferably at least 1.0 mm, and even more preferably at least 1.2 mm. The upper limit in the envelope layer thickness is preferably not more than 2.0 mm, more preferably not more than 1.8 mm, and even more preferably not more than 1.7 mm. When the envelope layer is too thin, the spin rate-lowering effect on full shots with a utility club or an iron may be inadequate and the intended distance may not be attainable. On the other hand, when the envelope layer is too thick, the initial velocity of the overall ball may be low and the initial velocity on actual shots may be too low, as a result of which the intended distance may not be attainable. Also, it is preferable to form the envelope layer so as to be thicker than the subsequently described intermediate layer or to have both layers be the same thickness, and more preferable to form the envelope layer so as to be thicker than the intermediate layer.

The envelope layer material is not particularly limited, although preferred use can be made of various types of thermoplastic resin materials. Especially preferred materials include resin compositions containing as the essential ingredients:

100 parts by weight of a resin component composed of, in admixture, (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (B) a non-ionomeric thermoplastic elastomer in a weight ratio between 100:0 and 50:50;

(C) from 5 to 120 parts by weight of a fatty acid and/or fatty acid derivative having a molecular weight of from 228 to 1,500; and (D) from 0.1 to 17 parts by weight of a basic inorganic metal compound capable of neutralizing un-neutralized acid groups in components (A) and (C).

Components (A) to (D) in the intermediate layer-forming resin material described in, for example, JP-A 2010-253268 may be advantageously used as above components (A) to (D).

Exemplary non-ionomeric thermoplastic elastomers include polyolefin elastomers (including polyolefin and metallocene polyolefins), polystyrene elastomers, diene polymers, polyacrylate polymers, polyamide elastomers, polyurethane elastomers, polyester elastomers and polyacetals. A thermoplastic polyether ester elastomer is especially preferred.

The resin material of the envelope layer may include a high-acid ionomer. In this invention, "high-acid ionomer" refers to an ionomer resin having an unsaturated carboxylic acid content of at least 16 wt %. This applies also to the high-acid ionomer used as a resin material in the subsequently described intermediate layer.

The content of unsaturated carboxylic acid (acid content) included in the high-acid ionomer resin is typically at least 16 wt %, preferably at least 17 wt %, and more preferably at least 18 wt %. The upper limit is preferably 22 wt % or less, more preferably 21 wt % or less, and even more preferably 20 wt % or less. When this value is too small, the spin rate of the ball on full shots with a utility club or an iron may rise, as a result of which the intended distance may not be obtained. On the other hand, when this value is too large, the feel at impact may become too hard or the durability to cracking on repeated impact may worsen.

The amount of high-acid ionomer resin included per 100 wt % of the resin material is preferably at least 10 wt %, more preferably at least 30 wt %, and even more preferably at least 60 wt %. When the amount of high-acid ionomer resin included is too low, the spin rate on full shots with a utility club or an iron may rise and a good distance may not be achieved.

Depending on the intended use, optional additives may be suitably included in the above resin material. For example, various types of additives such as pigments, dispersants, antioxidants, ultraviolet absorbers and light stabilizers may be added.

Next, the intermediate layer is described.

The intermediate layer has a material hardness on the Shore D scale which, although not particularly limited, is preferably at least 64, more preferably at least 65, and even more preferably at least 66. The upper limit is preferably not more than 75, more preferably not more than 70, and even more preferably not more than 68. The surface hardness of the sphere obtained by encasing the envelope layer-encased sphere with the intermediate layer (intermediate layer-encased sphere), expressed on the Shore D scale, is preferably at least 68, more preferably at least 69, and even more preferably at least 70. The upper limit is preferably not more than 81, more preferably not more than 76, and even more preferably not more than 74. When the material and surface hardnesses of the intermediate layer are lower than the above ranges, the ball may be too receptive to spin on full shots or the initial velocity may become low, as a result of which a good distance may not be attained. On the other hand, when the material and surface hardnesses are too high, the durability to cracking on repeated impact may worsen or the feel at impact on shots with a putter or on short approaches may become too hard.

The intermediate layer has a material hardness on the Shore C scale which is preferably at least 90, more preferably at least 92, and even more preferably at least 93. The upper limit value is preferably not more than 100, more preferably not more than 98, and even more preferably not more than 96. The intermediate layer-encased sphere has a surface hardness on the Shore C scale which is preferably at least 95, more preferably at least 96, and even more preferably at least 97. The upper limit value is preferably not more than 100, more preferably not more than 99, and even more preferably not more than 98.

The intermediate layer-encased sphere is formed so as to have a surface hardness that is higher than the ball surface hardness. When the ball has a higher surface hardness than the intermediate layer-encased sphere, the durability to cracking on repeated impact may worsen or the controllability in the short game may worsen.

The intermediate layer has a thickness which is preferably at least 0.7 mm, more preferably at least 0.8 mm, and even more preferably at least 1.0 mm. The upper limit in the intermediate layer thickness is preferably not more than 1.8 mm, more preferably not more than 1.4 mm, and even more preferably not more than 1.2 mm. It is preferable for the intermediate layer to be thicker than the subsequently described cover (outermost layer). When the thickness of the intermediate layer falls outside of the above range or is lower than the cover thickness, the spin rate-lowering effect on full shots with a utility club or an iron may be inadequate, which may result in a poor distance. Also, when the intermediate layer is thinner than the above range, the durability to cracking on repeated impact and the low-temperature durability may worsen.

The intermediate layer material may be suitably selected from among various types of thermoplastic resins that are used as golf ball materials, with the use of the highly neutralized resin material containing components (A) to (D) described above in connection with the envelope layer material or an ionomer resin being preferred.

Specific examples of ionomer resin materials include sodium-neutralized ionomer resins and zinc-neutralized ionomer resins. These may be used singly or two or more may be used together.

An embodiment that uses in admixture a zinc-neutralized ionomer resin and a sodium-neutralized ionomer resin as the chief materials is especially preferred. The blending ratio therebetween, expressed as the weight ratio (zinc-neutralized ionomer)/(sodium-neutralized ionomer), is from 5/95 to 95/5, preferably from 10/90 to 90/10, and more preferably from 15/85 to 85/15. When the zinc-neutralized ionomer and sodium-neutralized ionomer are not included in a ratio within this range, the rebound may become too low, as a result of which the desired distance may not be achieved, the durability to cracking on repeated impact at normal temperatures may worsen, or the durability to cracking at low temperatures (subzero Centigrade) may worsen.

The resin material used to form the intermediate layer may include a high-acid ionomer. For example, a resin material obtained by blending, of commercially available ionomer resins, a high-acid ionomer resin having an acid content of at least 16 wt % with an ordinary ionomer resin may be used. The lower spin rate resulting from the use of such a blend enables a good distance to be achieved on full shots with a utility club or an iron.

The amount of unsaturated carboxylic acid included in the high-acid ionomer resin (acid content) is generally at least 16 wt %, preferably at least 17 wt %, and more preferably at least 18 wt %. The upper limit is preferably not more than 22 wt %, more preferably not more than 21 wt %, and even more preferably not more than 20 wt %. When this value is too small, the spin rate on full shots with a utility club or an iron may rise, as a result of which the intended distance may not be attainable. On the other hand, when this value is too large, the feel at impact may become too hard, or the durability to cracking on repeated impact may worsen.

The amount of high-acid ionomer resin included per 100 wt % of the resin material is preferably at least 20 wt %, more preferably at least 50 wt %, and even more preferably at least 60 wt %. The upper limit is 100 wt % or less, preferably 90 wt % or less, and more preferably 85 wt % or less. When the content of this high-acid ionomer resin is too low, the spin rate on full shots may rise and a good distance may not be attained. On the other hand, when the content is too high, the durability to repeated impact may worsen.

Depending on the intended use, optional additives may be suitably included in the intermediate layer material. For example, pigments, dispersants, antioxidants, ultraviolet absorbers and light stabilizers may be added. When these additives are included, the amount added per 100 parts by weight of the base resin is preferably at least 0.1 part by weight, and more preferably at least 0.5 part by weight. The upper limit is preferably not more than 10 parts by weight, and more preferably not more than 4 parts by weight.

It is desirable to abrade the surface of the intermediate layer in order to increase adhesion of the intermediate layer material with the polyurethane that is preferably used in the subsequently described cover material. In addition, it is desirable to apply a primer (adhesive) to the surface of the intermediate layer following such abrasion treatment or to add an adhesion reinforcing agent to the intermediate layer material.

The intermediate layer material has a specific gravity which is typically less than 1.1, preferably between 0.90 and 1.05, and more preferably between 0.93 and 0.99. Outside of this range, the rebound of the overall ball may decrease and a good distance may not be obtained, or the durability of the ball to cracking on repeated impact may worsen.

Next, the cover (outermost layer) is described.

The cover has a material hardness on the Shore D scale which, although not particularly limited, is preferably at least 30, more preferably at least 35, and even more preferably at least 40. The upper limit is preferably not more than 53, more preferably not more than 50, and even more preferably not more than 47. The surface hardness of the sphere obtained by encasing the intermediate layer-encased sphere with the cover (i.e., ball surface hardness), expressed on the Shore D scale, is preferably at least 50, more preferably at least 53, and even more preferably at least 56. The upper limit is preferably not more than 70, more preferably not more than 65, and even more preferably not more than 60. When the material hardness of the cover and the ball surface hardness are lower than the above respective ranges, the spin rate of the ball on full shots with a utility club or an iron may rise and the desired distance may not be achieved. On the other hand, when the material hardness of the cover and the ball surface hardness are too high, the desired spin rate may not be achieved on approach shots or the durability to repeated impact may worsen.

The material hardness of the cover, expressed on the Shore C scale, is preferably at least 50, more preferably at least 57, and even more preferably at least 63. The upper limit value is preferably not more than 80, more preferably not more than 74, and even more preferably not more than 70. The surface hardness of the ball, expressed on the Shore C scale, is preferably at least 73, more preferably at least 78, and even more preferably at least 83. The upper limit value is preferably not more than 95, more preferably not more than 92, and even more preferably not more than 90.

The cover has a thickness of preferably at least 0.3 mm, more preferably at least 0.45 mm, and even more preferably at least 0.6 mm. The upper limit in the cover thickness is preferably not more than 1.2 mm, more preferably not more than 0.9 mm, and even more preferably not more than 0.8 mm. When the cover is too thick, the rebound on full shots with a utility club or an iron may become inadequate or the spin rate may rise, as a result of which the desired distance may not be achieved. On the other hand, when the cover is too thin, the scuff resistance may worsen or the ball may not be fully receptive to spin on approach shots and may thus lack sufficient controllability.

Various types of thermoplastic resins employed as cover stock in golf balls may be used as the cover material. For reasons having to do with controllability and scuff resistance, preferred use can be made of a urethane resin. In particular, from the standpoint of the mass productivity of the manufactured balls, it is preferable to use a material that is composed primarily of a thermoplastic polyurethane, and more preferable to form the cover of a resin blend in which the main components are (I) a thermoplastic polyurethane and (II) a polyisocyanate compound.

It is recommended that the total weight of components (I) and (II) combined be at least 60%, and more preferably at least 70%, of the overall amount of the cover-forming resin composition. Components (I) and (II) are described in detail below.

The thermoplastic polyurethane (I) has a structure which includes soft segments composed of a polymeric polyol (polymeric glycol) that is a long-chain polyol, and hard segments composed of a chain extender and a polyisocyanate compound. Here, the long-chain polyol serving as a starting material may be any that has hitherto been used in the art relating to thermoplastic polyurethanes, and is not particularly limited. Illustrative examples include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly, or two or more may be used in combination. Of these, in terms of being able to synthesize a thermoplastic polyurethane having a high rebound resilience and excellent low-temperature properties, a polyether polyol is preferred.

Any chain extender that has hitherto been employed in the art relating to thermoplastic polyurethanes may be suitably used as the chain extender. For example, low-molecular-weight compounds with a molecular weight of 400 or less which have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these, the chain extender is preferably an aliphatic diol having from 2 to 12 carbon atoms, and is more preferably 1,4-butylene glycol.

Any polyisocyanate compound hitherto employed in the art relating to thermoplastic polyurethanes may be suitably used without particular limitation as the polyisocyanate compound. For example, use may be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. However, depending on the type of isocyanate, the crosslinking reactions during injection molding may be difficult to control. In the practice of the invention, to provide a balance between stability at the time of production and the properties that are manifested, it is most preferable to use the following aromatic diisocyanate: 4,4'-diphenylmethane diisocyanate.

Commercially available products may be used as the thermoplastic polyurethane serving as component (I). Illustrative examples include Pandex T-8295, Pandex T-8290 and Pandex T-8260 (all from DIC Covestro Polymer, Ltd.).

A thermoplastic elastomer other than the above thermoplastic polyurethanes may also be optionally included as a separate component, i.e., component (III), together with above components (I) and (II). By including this component (III) in the above resin blend, the flowability of the resin blend can be further improved and properties required of the golf ball cover material, such as resilience and scuff resistance, can be increased.

The compositional ratio of above components (I), (II) and (III) is not particularly limited. However, to fully elicit the advantageous effects of the invention, the compositional ratio (I):(II):(III) is preferably in the weight ratio range of from 100:2:50 to 100:50:0, and more preferably from 100:2:50 to 100:30:8.

In addition, various additives other than the ingredients making up the above thermoplastic polyurethane may be optionally included in this resin blend. For example, pigments, dispersants, antioxidants, light stabilizers, ultraviolet absorbers and internal mold lubricants may be suitably included.

The manufacture of multi-piece solid golf balls in which the above-described core, envelope layer, intermediate layer and cover (outermost layer) are formed as successive layers may be carried out by a customary method such as a known injection molding process. For example, a multi-piece golf ball can be produced by successively injection-molding the respective materials for the envelope layer and the intermediate layer over the core in injection molds for each layer so as to obtain the respective layer-encased spheres and then, last of all, injection-molding the material for the cover serving as the outermost layer over the intermediate layer-encased sphere. Alternatively, the encasing layers may each be formed by enclosing the sphere to be encased within two half-cups that have been pre-molded into hemispherical shapes and then molding under applied heat and pressure.

The golf ball has a deflection when compressed under a final load of 1,275 N (130 kgf) from an initial load of 98 N (10 kgf) which must be at least 2.7 mm and is preferably at least 2.9 mm, and more preferably at least 3.0 mm. The upper limit value is preferably not more than 3.8 mm, more preferably not more than 3.6 mm, and even more preferably not more than 3.4 mm. When the deflection by the golf ball is too small, i.e., when the ball is too hard, the spin rate may rise excessively so that the ball does not achieve a good distance, or the feel at impact may be too hard. On the other hand, when the deflection is too large, i.e., when the ball is too soft, the ball rebound may be too low so that the ball does not achieve a good distance, the feel at impact may be too soft, or the durability to cracking under repeated impact may worsen.

Hardness Relationships Among Layers

In the invention, to achieve both a superior distance performance on full shots with a utility club or an iron and an excellent playability in the short game, the surface hardness of the core, the surface hardness of the sphere obtained by encasing the core with the envelope layer (envelope layer-encased sphere), the surface hardness of the sphere obtained by encasing the envelope layer-encased sphere with the intermediate layer (intermediate layer-encased sphere) and the surface hardness of the ball obtained by encasing the intermediate layer-encased sphere with the cover have hardness relationships therebetween (wherein the surface hardnesses signify Shore C hardnesses) which must satisfy formula (1) below:

surface hardness of envelope layer-encased sphere<surface hardness of intermediate layer-encased sphere, (1)

and which preferably satisfy formula (1"):

surface hardness of envelope layer-encased sphere<surface hardness of intermediate layer-encased sphere>surface hardness of ball, (1")

and more preferably satisfy formula (1'):

surface hardness of core<surface hardness of envelope layer-encased sphere<surface hardness of intermediate layer-encased sphere>surface hardness of ball. (1')

The intermediate layer-encased sphere has a higher surface hardness than the envelope layer-encased sphere, the difference between these surface hardnesses on the Shore C scale being preferably at least 1, more preferably at least 3, and even more preferably at least 5. The upper limit value is preferably not more than 25, more preferably not more than 17, and even more preferably not more than 14. When this value falls outside of the above range, the spin rate on full shots with a utility club or an iron may rise and the intended distance may not be achievable.

The intermediate layer-encased sphere has a higher surface hardness than the ball, the difference between these surface hardnesses on the Shore C scale being preferably at least 2, more preferably at least 4, and even more preferably at least 6. The upper limit value is preferably not more than 25, more preferably not more than 17, and even more preferably not more than 14. When this value is too small, the controllability in the short game may worsen. When this value is too large, the spin rate on full shots may rise, as a result of which the intended distance may not be achievable.

The envelope layer-encased sphere has a higher surface hardness than the core, the difference between these surface hardnesses on the Shore C scale being preferably at least 1, more preferably at least 4, and even more preferably at least 8. The upper limit value is preferably not more than 25, more preferably not more than 20, and even more preferably not more than 18. When this value falls outside of the above range, the spin rate on full shots may rise, as a result of which the intended distance may not be achievable.

Also, regarding the relationship of the envelope layer-encased sphere and the intermediate layer-encased sphere with the center hardness of the core, it is preferable for the surface hardnesses of the envelope layer-encased sphere and the intermediate layer-encased sphere to be higher than the center hardness of the core.

The value of (surface hardness of envelope layer-encased sphere)−(center hardness of core), expressed on the Shore C hardness scale, is preferably at least 28, more preferably at least 32, and even more preferably at least 35. The upper limit value is preferably not more than 45, more preferably not more than 42, and even more preferably not more than 40. When this value is too large, the durability to cracking on repeated impact may worsen, or the initial velocity on shots may become low, as a result of which the intended distance may not be attainable. On the other hand, when this value is too small, the spin rate on full shots may rise and the intended distance may not be attained.

The inventive golf ball must satisfy the condition expressed in formula (2) below:

surface hardness of intermediate layer-encased sphere−center hardness of core (Shore C hardness)≥40. (2)

That is, the Shore C hardness value obtained by subtracting the center hardness of the core from the surface hardness of the intermediate layer-encased sphere is at least 40, preferably at least 41, and more preferably at least 42. The upper limit is preferably 53 or less, more preferably 50 or less, and even more preferably 47 or less. When this value is too large, the durability to cracking on repeated impact may worsen and the initial velocity on shots may become lower, as a result of which the intended distance may not be attained. On the other hand, when this value is too small, the spin rate on full shots with a utility club or an iron rises, as a result of which the desired distance cannot be attained.

Thickness Relationships Among Layers

In this invention, from the standpoint of obtaining a superior distance performance on full shots not only with a driver (W #1) but also with an iron, the thickness of the envelope layer, the thickness of the intermediate layer and the thickness of the cover preferably satisfy formula (3) below:

cover thickness<intermediate layer thickness<envelope layer thickness. (3)

Relationship Between Core Diameter and Ball Diameter

In this invention, to obtain a superior distance performance on full shots not only with a driver (W #1) but also with an iron, the (core diameter)/(ball diameter) ratio has a value that is preferably at least 0.820, more preferably at least 0.824, and even more preferably at least 0.828. The upper limit value is preferably not more than 0.970, more preferably not more than 0.920, and even more preferably not more than 0.900. When this value is too small, the initial velocity of the ball may decrease, the deflection hardness of the overall ball may become high or the spin rate on full shots may rise, as a result of which the intended distance may not be attainable. When this value is too large, the spin rate on full shots may rise, as a result of which the intended distance may not be attainable, or the durability to cracking on repeated impact may worsen.

Numerous dimples may be formed on the outside surface of the cover. The number of dimples arranged on the cover surface, although not particularly limited, is preferably at least 250, more preferably at least 300, and even more preferably at least 320. The upper limit is preferably not more than 380, more preferably not more than 350, and even more preferably not more than 340. When the number of dimples is higher than this range, the ball trajectory may become lower and the distance traveled by the ball may decrease. On the other hand, when the number of dimples is lower that this range, the ball trajectory may become higher and a good distance may not be achieved.

The dimple shapes used may be of one type or may be a combination of two or more types suitably selected from among, for example, circular shapes, various polygonal shapes, dewdrop shapes and oval shapes. When circular dimples are used, the dimple diameter may be set to at least about 2.5 mm and up to about 6.5 mm, and the dimple depth may be set to at least 0.08 mm and up to 0.30 mm.

In order for the aerodynamic properties to be fully manifested, it is desirable for the dimple coverage ratio on the spherical surface of the golf ball, i.e., the dimple surface coverage SR, which is the sum of the individual dimple surface areas, each defined by the flat plane circumscribed by the edge of a dimple, as a percentage of the spherical surface area of the ball were the ball to have no dimples thereon, to be set to at least 70% and not more than 90%. Also, to optimize the ball trajectory, it is desirable for the value Vo, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of a dimple, with respect to the volume of the ball sphere were the ball surface to have no dimples thereon, to be set to at least 0.6% and not more than 1.0%. Outside of the above ranges in these respective values, the resulting trajectory may not enable a good distance to be achieved and so the ball may fail to travel a fully satisfactory distance.

A coating layer may be formed on the surface of the cover. This coating layer can be formed by applying various types of coating materials. Because the coating layer must be capable of enduring the harsh conditions of golf ball use, it is desirable to use a coating composition in which the chief component is a urethane coating material composed of a polyol and a polyisocyanate.

The polyol component is exemplified by acrylic polyols and polyester polyols. These polyols include modified polyols. To further increase workability, other polyols may also be added.

It is suitable to use two types of polyester polyols together as the polyol component. In this case, letting the two types of polyester polyol be component (a) and component (b), a polyester polyol in which a cyclic structure has been introduced onto the resin skeleton may be used as the polyester polyol of component (a). Examples include polyester polyols obtained by the polycondensation of a polyol having an alicyclic structure, such as cyclohexane dimethanol, with a polybasic acid; and polyester polyols obtained by the polycondensation of a polyol having an alicyclic structure with a diol or triol and a polybasic acid. A polyester polyol having a branched structure may be used as the polyester polyol of component (b). Examples include polyester polyols having a branched structure, such as NIPPOLAN 800, from Tosoh Corporation.

The polyisocyanate is exemplified without particular limitation by commonly used aromatic, aliphatic, alicyclic and other polyisocyanates. Specific examples include tolylene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate and 1-isocyanato-3,3,5-trimethyl-4-isocyanatomethylcyclohexane. These may be used singly or in admixture.

Depending on the coating conditions, various types of organic solvents may be mixed into the coating composition. Examples of such organic solvents include aromatic solvents such as toluene, xylene and ethylbenzene; ester solvents such as ethyl acetate, butyl acetate, propylene glycol methyl ether acetate and propylene glycol methyl ether propionate; ketone solvents such as acetone, methyl ethyl ketone, methyl isobutyl ketone and cyclohexanone; ether solvents such as diethylene glycol dimethyl ether, diethylene glycol diethyl ether and dipropylene glycol dimethyl ether; alicyclic hydrocarbon solvents such as cyclohexane, methyl cyclohexane and ethyl cyclohexane; and petroleum hydrocarbon solvents such as mineral spirits.

When the above coating composition is used, the formation of a coating layer on the surface of golf balls manufactured by a known method can be carried out via the steps of preparing the coating composition at the time of application, applying the composition onto the golf ball surface by a conventional coating operation, and drying the applied composition. The coating method is not particularly limited. For example, spray painting, electrostatic painting or dipping may be suitably used.

The thickness of the coating layer made of the coating composition, although not particularly limited, is typically from 5 to 40 μm, and preferably from 10 to 20 μm. As used herein, "coating layer thickness" refers to the coating thickness obtained by averaging the measurements taken at a total of three places: the center of a dimple and two places located at positions between the dimple center and the dimple edge.

In this invention, the coating layer composed of the above coating composition has an elastic work recovery that is preferably at least 60%, and more preferably at least 80%. At a coating layer elastic work recovery in this range, the coating layer has a high elasticity and so the self-repairing ability is high, resulting in an outstanding abrasion resistance. Moreover, the performance attributes of golf balls coated with this coating composition can be improved. The method of measuring the elastic work recovery is described below.

The elastic work recovery is one parameter of the nanoindentation method for evaluating the physical properties of coating layers, this being a nanohardness test method that controls the indentation load on a micro-newton (μN) order and tracks the indenter depth during indentation to a nanometer (nm) precision. In prior methods, only the size of the deformation (plastic deformation) mark corresponding to the maximum load could be measured. However, in the nanoindentation method, the relationship between the indentation load and the indentation depth can be obtained by continuous automated measurement. Hence, unlike in the past, there are no individual differences between observers when visually measuring a deformation mark under an optical microscope, and so it is thought that the physical properties of the coating layer can be precisely evaluated. Given that the coating layer on the ball surface is strongly affected by the impact of various types of clubs, such as drivers, utility clubs and irons, and has a not inconsiderable influence on various golf ball properties, measuring the coating layer by the nanohardness test method and carrying out such measurement to a higher precision than in the past is a very effective method of evaluation.

The hardness of the coating layer, as expressed on the Shore M hardness scale, is preferably at least 40, and more preferably at least 60. The upper limit is preferably not more than 95, and more preferably not more than 85. This Shore M hardness is obtained in accordance with ASTM D2240. The hardness of the coating layer, as expressed on the Shore C hardness scale, is preferably at least 40 and has an upper limit of preferably not more than 80. This Shore C hardness is obtained in accordance with ASTM D2240. At coating layer hardnesses that are higher than these ranges, the coating may become brittle when the ball is repeatedly struck, which may make it incapable of protecting the cover layer. On the other hand, coating layer hardnesses that are lower than the above range are undesirable because the ball surface is more easily damaged when striking a hard object.

Regarding the hardness relationship between the coating layer and the cover, the value obtained by subtracting the material hardness of the coating layer from the material hardness of the cover, expressed on the Shore C hardness scale, is preferably at least −20, more preferably at least −15, and even more preferably at least −10. The upper limit value is preferably not more than 25, more preferably not more than 20, and even more preferably not more than 15. Outside of this range, the coating may readily peel when the ball is struck.

EXAMPLES

The following Examples and Comparative Examples are provided to illustrate the invention, and are not intended to limit the scope thereof.

Examples 1 to 6, Comparative Examples 1 to 8

Formation of Core

Solid cores were produced by preparing rubber compositions for Examples 1 to 3 and Comparative Examples 4 and 5 shown in Table 1, and then molding and vulcanizing the compositions under vulcanization conditions of 152° C. and 19 minutes.

Solid cores in Examples 4 to 6 and Comparative Examples 1 to 3 and 6 to 8 are produced in the same way using the rubber compositions and vulcanization conditions in Table 1.

layer and intermediate layer materials formulated as shown in Table 2 over the resulting core, thereby obtaining the respective layer-encased spheres. In Comparative Examples 4 and 5, because there was no envelope layer, the core was encased directly by the intermediate layer in the same manner as above, thereby obtaining an intermediate layer-encased sphere. The cover (outermost layer) was then formed by injection-molding the cover material formulated as shown in the same table over the resulting intermediate layer-encased sphere, thereby producing a multi-piece solid golf ball. A plurality of given dimples common to all of the Examples and Comparative Examples were formed at this time on the surface of the cover.

Likewise, in Examples 4 to 6 and Comparative Examples 1 to 3 and 6 to 8, an envelope layer and an intermediate layer are formed in the same way as described above, giving the respective layer-encased spheres. The cover (outermost layer) is then formed by injection-molding the cover material formulated as shown in the same table over the resulting intermediate layer-encased sphere, thereby producing a multi-piece solid golf ball. A plurality of given dimples

TABLE 1

| Core formulation | Example | | | | | | Comparative Example | | | | | | | |
|---|---|---|---|---|---|---|---|---|---|---|---|---|---|---|
| (pbw) | 1 | 2 | 3 | 4 | 5 | 6 | 1 | 2 | 3 | 4 | 5 | 6 | 7 | 8 |
| Polybutadiene A | | | | | | | | | | | | | 20 | |
| Polybutadiene B | 100 | 100 | 100 | 100 | 100 | 100 | 100 | 100 | 100 | 100 | 100 | 100 | 80 | 100 |
| Zinc acrylate | 34.9 | 32.7 | 30.5 | 33.8 | 34.9 | 30.3 | 34.1 | 33.4 | 34.9 | 35.4 | 33.2 | 26.6 | 25.5 | 34.9 |
| Organic peroxide (1) | 0.6 | 0.6 | 0.6 | 0.6 | 0.6 | 0.6 | 0.6 | 0.6 | 0.6 | 0.6 | 0.6 | 0.3 | | 0.6 |
| Organic peroxide (2) | | | | | | | | | | | | 0.3 | 1.2 | |
| Water | 0.9 | 0.9 | 0.9 | 0.9 | 0.9 | 0.9 | 0.6 | 0.6 | 0.9 | 0.9 | 0.9 | | | 0.9 |
| Antioxidant | 0.1 | 0.1 | 0.1 | 0.1 | 0.1 | 0.1 | 0.1 | 0.1 | 0.1 | 0.1 | 0.1 | 0.1 | 0.1 | 0.1 |
| Zinc oxide | 23.9 | 25.0 | 26.1 | 24.5 | 27.7 | 28.9 | 24.9 | 25.2 | 23.9 | 18.5 | 19.7 | 29.8 | 29.9 | 23.9 |
| Zinc salt of pentachlorothiophenol | 1.0 | 1.0 | 1.0 | 1.0 | 1.0 | 1.0 | 1.0 | 1.0 | 1.0 | 1.0 | 1.0 | 0.2 | 0.2 | 1.0 |
| Vulcanization Temperature (° C.) | 152 | 152 | 152 | 152 | 152 | 152 | 152 | 152 | 152 | 152 | 152 | 155 | 155 | 152 |
| Time (mm) | 19 | 19 | 19 | 19 | 19 | 19 | 19 | 19 | 19 | 19 | 19 | 14 | 14 | 19 |

Details on the ingredients mentioned in Table 1 are given below.
Polybutadiene A: Available under the trade name "BR 51" from JSR Corporation
Polybutadiene B: Available under the trade name "BR 730" from JSR Corporation
Zinc acrylate: "ZN-DA85S" from Nippon Shokubai Co., Ltd.
Organic Peroxide (1): Dicumyl peroxide, available under the trade name "Percumyl D" from NOF Corporation
Organic Peroxide (2): A mixture of 1,1-di(t-butylperoxy) cyclohexane and silica, available under the trade name "Perhexa C-40" from NOF Corporation
Water: Pure water (from Seiki Chemical Industrial Co., Ltd.)
Antioxidant: 2,2'-Methylenebis(4-methyl-6-butylphenol), available under the trade name "Nocrac NS-6" from Ouchi Shinko Chemical Industry Co., Ltd.
Zinc oxide: Available as Grade 3 Zinc Oxide from Sakai Chemical Co., Ltd.
Zinc salt of pentachlorothiophenol: Available from Wako Pure Chemical Industries, Ltd.
Formation of Envelope Layer, Intermediate Layer and Cover (Outermost Layer)

Next, in Examples 1 to 3 and Comparative Examples 4 and 5, an envelope layer and an intermediate layer were formed by successively injection-molding the envelope common to all of the Examples and Comparative Examples are formed at this time on the surface of the cover.

TABLE 2

| Resin composition (pbw) | Acid content (wt %) | No. 1 | No. 2 | No. 3 | No. 4 | No. 5 | No. 6 |
|---|---|---|---|---|---|---|---|
| HPF 1000 | 12 | 100 | 100 | 56 | | | |
| Himilan 1605 | 15 | | | 44 | | 50 | |
| Himilan 1557 | 12 | | | | | | 12 |
| Himilan 1706 | 15 | | | | 15 | | 38 |
| AM7318 | 18 | | | | 85 | | |
| Trimethylolpropane | | | 1.1 | | | 1.1 | 1.1 |
| TPU | | | | | | | 100 |

Trade names of the chief materials mentioned in the table are given below.
HPF 1000: HPF™ 1000, from The Dow Chemical Company
Himilan: Ionomers available from Dow-Mitsui Polychemicals Co., Ltd.
AM7318: An ionomer available from Dow-Mitsui Polychemicals Co., Ltd.
Trimethylolpropane: TMP, available from Tokyo Chemical Industry Co., Ltd.
TPU: An ether-type thermoplastic polyurethane available under the trade name "Pandex" from DIC Covestro Polymer, Ltd.

Figure 5A:
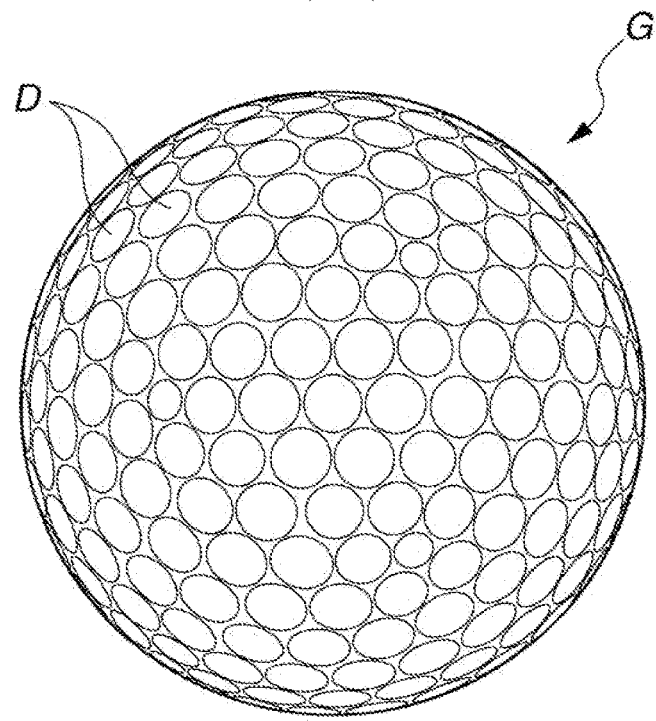
FIGS. 5A and 5B are, respectively, a top view and a side view of the exterior of a golf ball showing the arrangement of dimples common to all of the Examples and Comparative Examples described in the present Specification.
Figure 5B:
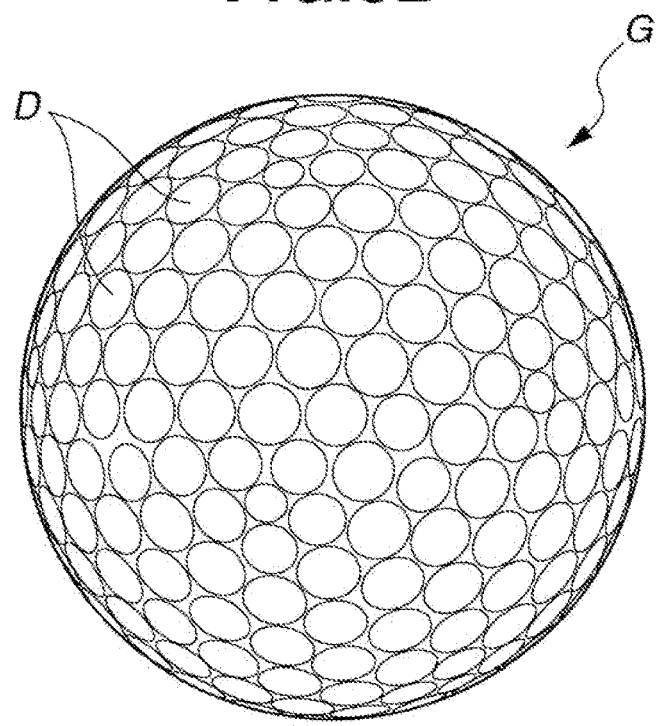

Six types of circular dimples are used. The dimples and the dimple pattern are common to all of the Examples and Comparative Examples. Details on the dimples are shown in Table 3 below, and the dimple pattern is shown in FIG. 5. FIG. 5A is a top view of the dimples, and FIG. 5B is a side view of the same.

TABLE 3

| Dimple D | Number | Diameter (mm) | Depth (mm) | Volume (mm3) | Cylinder volume ratio | SR (%) | VR (%) |
|---|---|---|---|---|---|---|---|
| D-1 | 204 | 4.4 | 0.136 | 1.013 | 0.490 | 82.75 | 0.77 |
| D-2 | 48 | 3.9 | 0.135 | 0.790 | 0.490 | | |
| D-3 | 12 | 2.9 | 0.100 | 0.324 | 0.490 | | |
| D-4 | 36 | 4.3 | 0.144 | 1.024 | 0.490 | | |
| D-5 | 24 | 3.9 | 0.143 | 0.837 | 0.490 | | |
| D-6 | 14 | 4.0 | 0.120 | 0.739 | 0.490 | | |
| Total | 338 | | | | | | |

Dimple Definitions

Edge: Highest place in cross-section passing through center of dimple.

Diameter: Diameter of flat plane circumscribed by edge of dimple.

Depth: Maximum depth of dimple from flat plane circumscribed by edge of dimple.

SR: Sum of individual dimple surface areas, each defined by flat plane circumscribed by edge of dimple, as a percentage of spherical surface area of ball were it to have no dimples thereon.

Dimple volume: Dimple volume below flat plane circumscribed by edge of dimple.

Cylinder volume ratio: Ratio of dimple volume to volume of cylinder having same diameter and depth as dimple.

VR: Sum of volumes of individual dimples formed below flat plane circumscribed by edge of dimple, as a percentage of volume of ball sphere were it to have no dimples thereon.

Formation of Coating Layer

Next, in Examples 1 to 3 and Comparative Examples 4 and 5, using the coating composition shown in Table 4 below as a coating composition common to all the Examples and Comparative Examples, the coating was applied with an air spray gun onto the surface of the cover (outermost layer) having numerous dimples thereon, thereby producing golf balls with a 15 μm-thick coating layer formed thereon.

The above coating is similarly applied in Examples 4 to 6 and Comparative Examples 1 to 3 and 6 to 8, thereby producing golf balls having a 15 μm-thick coating layer formed thereon.

TABLE 4

| Coating composition (pbw) | Base resin | Polyester polyol (A) | 23 |
|---|---|---|---|
| | | Polyester polyol (B) | 15 |
| | | Organic solvent | 62 |
| | Curing agent | Isocyanate (HMDI isocyanurate) | 42 |
| | | Solvent | 58 |
| | | Molar blending ratio (NCO/OH) | 0.89 |
| Coating properties | | Elastic work recovery (%) | 84 |
| | | Shore M hardness | 84 |
| | | Shore C hardness | 63 |
| | | Thickness (μm) | 15 |

Polyester Polyol (A) Synthesis Example

A reactor equipped with a reflux condenser, a dropping funnel, a gas inlet and a thermometer was charged with 140 parts by weight of trimethylolpropane, 95 parts by weight of ethylene glycol, 157 parts by weight of adipic acid and 58 parts by weight of 1,4-cyclohexanedimethanol, following which the temperature was raised to between 200 and 240° C. under stirring and the reaction was effected by 5 hours of heating. This yielded Polyester Polyol (A) having an acid value of 4, a hydroxyl value of 170 and a weight-average molecular weight (Mw) of 28,000.

Next, the Polyester Polyol (A) thus synthesized was dissolved in butyl acetate, thereby preparing a varnish having a nonvolatiles content of 70 wt %.

The base resin for the coating composition in Table 4 was prepared by mixing together 23 parts by weight of the above polyester polyol solution, 15 parts by weight of Polyester Polyol (B) (the saturated aliphatic polyester polyol NIPPOLAN 800 from Tosoh Corporation; weight-average molecular weight (Mw), 1,000; 100% solids) and the organic solvent. This mixture had a nonvolatiles content of 38.0 wt %.

Elastic Work Recovery

The elastic work recovery of the coating material is measured using a coating sheet having a thickness of 50 μm. The ENT-2100 nanohardness tester from Erionix Inc. is used as the measurement apparatus, and the measurement conditions are as follows.

Indenter: Berkovich indenter (material: diamond; angle α: 65.03°)

Load F: 0.2 mN

Loading time: 10 seconds

Holding time: 1 second

Unloading time: 10 seconds

The elastic work recovery is calculated as follows, based on the indentation work $W_{elast}$ (Nm) due to spring-back deformation of the coating and on the mechanical indentation work $W_{total}$ (Nm).

$$\text{Elastic work recovery} = W_{elast}/W_{total} \times 100(\%)$$

Shore C Hardness and Shore M Hardness

The Shore C hardness and Shore M hardness in Table 4 above are determined by forming the material being tested into 2 mm thick sheets and stacking three such sheets together to give test specimens. Measurements are taken using a Shore C durometer and a Shore M durometer in accordance with ASTM D2240.

Various properties of the resulting golf balls, including the internal hardnesses of the core at various positions, the diameters of the core and each layer-encased sphere, the thickness and material hardness of each layer, and the surface hardness of each layer-encased sphere, are evaluated by the following methods. The results are presented in Tables 5 and 6.

Diameters of Core, Envelope Layer-Encased Sphere and Intermediate Layer-Encased Sphere The diameters at five random places on the surface are measured at a temperature of 23.9±1° C. and, using the average of these measurements as the measured value for a single core, envelope layer-encased sphere or intermediate layer-encased sphere, the average diameter for ten such spheres is determined.

Ball Diameter

The diameter at 15 random dimple-free areas is measured at a temperature of 23.9±1° C. and, using the average of these measurements as the measured value for a single ball, the average diameter for ten balls is determined.

Core and Ball Deflections

A core or ball is placed on a hard plate and the amount of deflection when compressed under a final load of 1,275 N (130 kgf) from an initial load of 98 N (10 kgf) is measured. The amount of deflection refers in each case to the measured value obtained after holding the core isothermally at 23.9° C. The rate at which pressure is applied by the head which compresses the ball was set to 10 mm/s.

Core Hardness Profile

The indenter of a durometer is set substantially perpendicular to the spherical surface of the core, and the core surface hardness on the Shore C hardness scale is measured in accordance with ASTM D2240. The hardnesses at the center and specific positions of the core are measured as Shore C hardness values by perpendicularly pressing the indenter of a durometer against the center portion and the specific positions shown in Table 5 on the flat cross-section obtained by cutting the core into hemispheres. The P2 Automatic Rubber Hardness Tester (Kobunshi Keiki Co., Ltd.) equipped with a Shore C durometer can be used for measuring the hardness. The maximum value is read off as the hardness value. Measurements are all carried out in a 23±2° C. environment. The numbers in Table 5 are Shore C hardness values.

Also, in the core hardness profile, letting Cc be the Shore C hardness at the center of the core, Cm be the Shore C hardness at the midpoint M between the core center and core surface, Cm-2, Cm-4 and Cm-6 be the respective Shore C hardnesses at positions 2 mm, 4 mm and 6 mm inward from the midpoint M, Cm+2, Cm+4 and Cm+6 be the respective Shore C hardnesses at positions 2 mm, 4 mm and 6 mm outward from the midpoint M and Cs be the Shore C hardness at the core surface, the surface areas A to F defined as follows surface area $A: \frac{1}{2} \times 2 \times (Cm-4-Cm-6)$ surface area $B: \frac{1}{2} \times 2 \times (Cm-2-Cm-4)$ surface area $C: \frac{1}{2} \times 2 \times (Cm-Cm-2)$ surface area $D: \frac{1}{2} \times 2 \times (Cm+2-Cm)$ surface area $E: \frac{1}{2} \times 2 \times (Cm+4-Cm+2)$ surface area $F: \frac{1}{2} \times 2 \times (Cm+6-Cm+4)$, are calculated, and the values of the following two expressions are determined:

(surface areas $E+F$)−(surface areas $A+B$)  (1)

(surface areas $D+E$)−(surface areas $B+C$)  (2)

Surface areas A to F in the core hardness profile are explained in FIG. 2, which is a graph that illustrates surface areas A to F using the core hardness profile data from Example 2.

Figure 3:
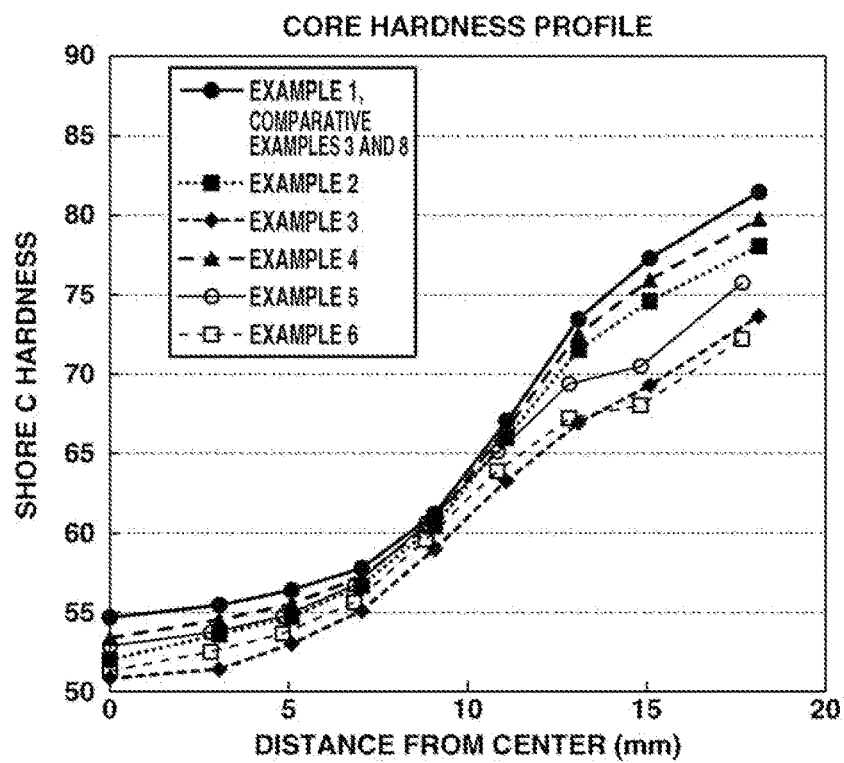
FIG. 3 is a graph showing the core hardness profiles in Examples 1 to 4 and Comparative Examples 3 and 8.
Figure 4:
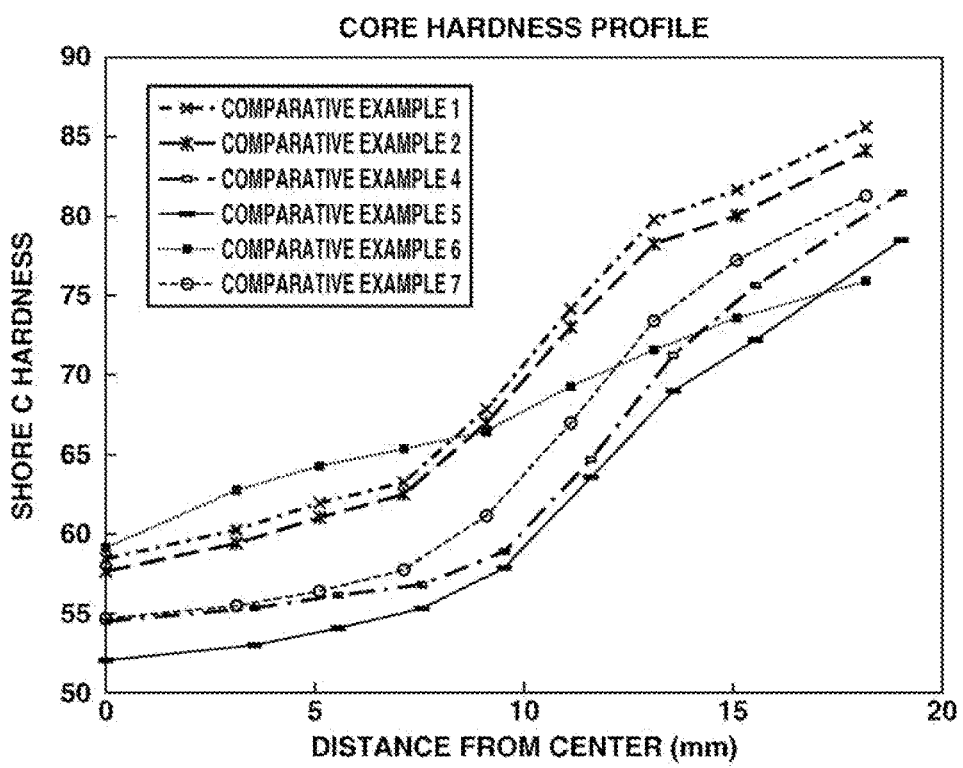
FIG. 4 is a graph showing the core hardness profiles in Comparative Examples 1, 2 and 4 to 7.

Also, FIGS. 3 and 4 show graphs of the core hardness profiles for Examples 1 to 4 and Comparative Examples 1 to 8.

Material Hardnesses (Shore C and Shore D) of Envelope Layer, Intermediate Layer and Cover The resin material for each layer is molded into a sheet having a thickness of 2 mm and left to stand for at least two weeks. The Shore C hardness and Shore D hardness of each material is then measured in accordance with ASTM D2240. The P2 Automatic Rubber Hardness Tester (Kobunshi Keiki Co., Ltd.) is used for measuring the hardness. Shore C hardness and Shore D hardness attachments are mounted on the tester and the respective hardnesses are measured. The maximum value is read off as the hardness value. Measurements are all carried out in a 23±2° C. environment.

Surface Hardnesses (Shore C and Shore D) of Envelope Layer-Encased Sphere, Intermediate Layer-Encased Sphere and Ball These hardnesses are measured by perpendicularly pressing an indenter against the surfaces of the respective spheres. The surface hardness of a ball (cover) is the value measured at a dimple-free area (land) on the surface of the ball. The Shore C and Shore D hardnesses are measured in accordance with ASTM D2240. The P2 Automatic Rubber Hardness Tester (Kobunshi Keiki Co., Ltd.) is used for measuring the hardness. Shore C hardness and Shore D hardness attachments are mounted on the tester and the respective hardnesses are measured. The maximum value is read off as the hardness value. Measurements are all carried out in a 23±2° C. environment.

TABLE 5

| | | Example | | | | | | Comparative Example | | | | | | | |
|---|---|---|---|---|---|---|---|---|---|---|---|---|---|---|---|
| | | 1 | 2 | 3 | 4 | 5 | 6 | 1 | 2 | 3 | 4 | 5 | 6 | 7 | 8 |
| Core | Diameter (mm) | 36.34 | 36.33 | 36.27 | 36.34 | 35.41 | 35.40 | 36.32 | 36.32 | 36.34 | 38.05 | 38.01 | 36.31 | 36.32 | 36.34 |
| | Weight (g) | 30.4 | 30.4 | 30.3 | 30.4 | 28.5 | 28.5 | 30.4 | 30.4 | 30.4 | 34.1 | 34.0 | 30.3 | 30.4 | 30.4 |
| | Deflection (mm) | 4.3 | 4.7 | 5.2 | 4.5 | 4.7 | 5.0 | 3.4 | 3.6 | 4.3 | 4.4 | 4.8 | 4.0 | 4.0 | 4.3 |
| Hardness profile | Core surface hardness: Cs (Shore C) | 81.4 | 78.0 | 73.6 | 79.7 | 75.8 | 72.2 | 85.6 | 84.1 | 81.4 | 81.5 | 78.5 | 76.0 | 80.2 | 81.4 |
| | Hardness at position 6 mm out from midpoint M: Cm + 6 (Shore C) | 77.2 | 74.6 | 69.3 | 75.9 | 70.5 | 68.0 | 81.7 | 80.2 | 77.2 | 75.6 | 72.1 | 73.6 | 71.4 | 77.2 |
| | Hardness at position 4 mm out from midpoint M: Cm + 4 (Shore C) | 73.4 | 71.5 | 66.9 | 72.5 | 69.4 | 67.2 | 79.8 | 78.3 | 73.4 | 71.2 | 68.9 | 71.6 | 70.2 | 73.4 |
| | Hardness at position 2 mm out from midpoint M: Cm + 2 (Shore C) | 67.0 | 65.9 | 63.3 | 66.5 | 65.1 | 63.8 | 74.2 | 73.0 | 67.0 | 64.7 | 63.5 | 69.3 | 68.7 | 67.0 |
| | Hardness at midpoint M: Cm (Shore C) | 61.2 | 60.5 | 59.0 | 60.8 | 60.5 | 59.6 | 67.9 | 67.0 | 61.2 | 58.8 | 57.8 | 66.5 | 67.3 | 61.2 |
| | Hardness at position 2 mm in from midpoint M: Cm − 2 (Shore C) | 57.8 | 56.7 | 55.1 | 57.3 | 56.7 | 55.6 | 63.3 | 62.5 | 57.8 | 56.8 | 55.3 | 65.4 | 67.2 | 57.8 |
| | Hardness at position 4 mm in from midpoint M: Cm − 4 (Shore C) | 56.4 | 54.8 | 53.0 | 55.6 | 54.8 | 53.7 | 61.9 | 61.0 | 56.4 | 56.1 | 54.0 | 64.3 | 67.0 | 56.4 |
| | Hardness at position 6 mm in from midpoint M: Cm − 6 (Shore C) | 55.5 | 53.6 | 51.4 | 54.6 | 53.8 | 52.5 | 60.3 | 59.4 | 55.5 | 55.4 | 52.9 | 62.8 | 65.2 | 55.5 |
| | Core center hardness: Cc (Shore C) | 54.7 | 52.0 | 50.9 | 53.3 | 52.9 | 51.3 | 58.4 | 57.7 | 54.7 | 54.5 | 52.0 | 59.1 | 61.3 | 54.7 |
| | Cs − Cc (Shore C) | 26.7 | 26.0 | 22.8 | 26.4 | 22.9 | 20.9 | 27.2 | 26.5 | 26.7 | 27.0 | 26.5 | 16.8 | 18.9 | 26.7 |
| | (Cs − Cc)/(Cm − Cc) | 4.1 | 3.1 | 2.8 | 3.5 | 3.0 | 2.5 | 2.9 | 2.9 | 4.1 | 6.2 | 4.5 | 2.3 | 3.1 | 4.1 |
| | Surface area A | 1.0 | 1.2 | 1.6 | 1.1 | 1.0 | 1.1 | 1.7 | 1.4 | 1.0 | 0.7 | 1.1 | 1.5 | 1.7 | 1.0 |
| | Surface area B | 1.4 | 1.9 | 2.1 | 1.7 | 1.9 | 2.0 | 1.4 | 2.0 | 1.4 | 0.7 | 1.3 | 1.1 | 0.2 | 1.4 |
| | Surface area C | 3.4 | 3.8 | 3.9 | 3.6 | 3.8 | 3.9 | 4.5 | 3.8 | 3.4 | 2.0 | 2.6 | 1.2 | 0.1 | 3.4 |
| | Surface area D | 5.8 | 5.5 | 4.3 | 5.7 | 4.6 | 4.3 | 6.3 | 4.9 | 5.8 | 5.9 | 5.7 | 2.8 | 1.4 | 5.8 |
| | Surface area E | 6.4 | 5.5 | 3.7 | 6.0 | 4.3 | 3.4 | 5.6 | 4.6 | 6.4 | 6.6 | 5.4 | 2.3 | 1.5 | 6.4 |
| | Surface area F | 3.8 | 3.1 | 2.3 | 3.5 | 1.1 | 0.8 | 1.9 | 2.7 | 3.8 | 4.4 | 3.2 | 2.0 | 1.3 | 3.8 |
| | (Surface areas E + F) − (Surface areas A + B) | 7.9 | 5.6 | 2.3 | 6.8 | 2.4 | 1.1 | 4.4 | 4.0 | 7.9 | 9.6 | 6.3 | 1.7 | 0.8 | 7.9 |
| | (Surface areas D + E) − (Surface areas B + C) | 7.5 | 5.4 | 2.0 | 6.4 | 3.1 | 1.8 | 6.1 | 3.7 | 7.5 | 9.7 | 7.2 | 2.8 | 2.5 | 7.5 |

TABLE 6

| | | Example | | | | | | Comparative Example | | | | | | | |
|---|---|---|---|---|---|---|---|---|---|---|---|---|---|---|---|
| | | 1 | 2 | 3 | 4 | 5 | 6 | 1 | 2 | 3 | 4 | 5 | 6 | 7 | 8 |
| Envelope layer | Construction (Piece) | 4P | 4P | 4P | 4P | 4P | 4P | 4P | 4P | 4P | 3P | 3P | 4P | 4P | 4P |
| | Material | No.1 | No.1 | No.3 | No.1 | No.1 | No.1 | No.1 | No.1 | No.1 | — | — | No.1 | No.1 | No.1 |
| | Thickness (mm) | 1.31 | 1.30 | 1.32 | 1.30 | 1.70 | 1.70 | 1.30 | 1.30 | 1.31 | — | — | 1.32 | 1.31 | 1.05 |
| | Material hardness (Shore C) | 82 | 82 | 88 | 82 | 82 | 82 | 82 | 82 | 82 | — | — | 82 | 82 | 93 |
| | Material hardness (Shore D) | 51 | 51 | 57 | 51 | 51 | 51 | 51 | 51 | 51 | — | — | 51 | 51 | 66 |
| Envelope layer-encased sphere | Outside diameter (mm) | 38.95 | 38.93 | 38.92 | 38.94 | 38.81 | 38.80 | 38.93 | 38.93 | 38.95 | — | — | 38.94 | 38.94 | 38.44 |
| | Weight (g) | 35.9 | 35.9 | 35.7 | 35.9 | 35.5 | 35.5 | 35.9 | 35.9 | 35.9 | — | — | 35.9 | 35.9 | 34.8 |
| | Surface hardness (Shore C) | 91 | 90 | 93 | 90 | 90 | 90 | 91 | 90 | 91 | — | — | 90 | 90 | 97 |
| | Surface hardness (Shore D) | 59 | 58 | 63 | 59 | 58 | 58 | 59 | 59 | 59 | — | — | 59 | 59 | 70 |
| Surface hardnes of envelope layer-encased sphere-Core center hardness (Shore C) | | 36 | 38 | 42 | 37 | 37 | 39 | 32 | 32 | 36 | — | — | 31 | 29 | 42 |
| Surface hardnes of envelope layer-encased sphere-Core surface hardness (Shore C) | | 9 | 12 | 19 | 11 | 14 | 18 | 5 | 5 | 9 | — | — | 14 | 10 | 15 |
| Intermediate layer | Material | No.4 | No.4 | No.4 | No.4 | No.4 | No.4 | No.4 | No.4 | No.5 | No.4 | No.4 | No.4 | No.4 | No.2 |
| | Thickness (mm) | 1.04 | 1.06 | 1.06 | 1.05 | 1.11 | 1.12 | 1.05 | 1.05 | 1.03 | 1.50 | 1.50 | 1.05 | 1.05 | 1.29 |
| | Material hardness (Shore C) | 93 | 93 | 93 | 93 | 93 | 93 | 93 | 93 | 91 | 93 | 93 | 93 | 93 | 82 |
| | Material hardness (Shore D) | 66 | 66 | 66 | 66 | 66 | 66 | 66 | 66 | 63 | 66 | 66 | 66 | 66 | 51 |
| Intermediate layer-encased sphere | Outside diameter (mm) | 41.04 | 41.05 | 41.03 | 41.04 | 41.03 | 41.03 | 41.02 | 41.02 | 41.02 | 41.04 | 41.02 | 41.04 | 41.04 | 41.03 |
| | Weight (g) | 40.8 | 40.9 | 40.8 | 40.8 | 40.6 | 40.6 | 40.8 | 40.8 | 40.9 | 40.9 | 40.7 | 40.8 | 40.8 | 40.9 |
| | Surface hardness (Shore C) | 97 | 97 | 98 | 97 | 97 | 97 | 97 | 97 | 97 | 98 | 98 | 97 | 97 | 90 |
| | Surface hardness (Shore D) | 70 | 70 | 71 | 70 | 70 | 70 | 71 | 70 | 70 | 70 | 70 | 70 | 70 | 59 |
| Surface hardness of intermediate layer-encased sphere-Core center hardness (Shore C) | | 42 | 45 | 47 | 43 | 44 | 45 | 38 | 39 | 42 | 43 | 46 | 38 | 35 | 35 |
| Surface hardnes of intermediate layer-encased sphere-Surface hardness of envelope layer-encased sphere (Shore C) | | 6 | 7 | 5 | 6 | 7 | 7 | 6 | 7 | 7 | — | — | 6 | 6 | −7 |
| Envelope layer thickness-Intermediate layer thickness (mm) | | 0.27 | 0.24 | 0.26 | 0.25 | 0.59 | 0.58 | 0.26 | 0.26 | 0.28 | — | — | 0.27 | 0.26 | −0.24 |
| Cover | Material | No.6 | No.6 | No.6 | No.6 | No.6 | No.6 | No.6 | No.6 | No.6 | No.6 | No.6 | No.6 | No.6 | No.6 |
| | Thickness (mm) | 0.86 | 0.85 | 0.85 | 0.85 | 0.83 | 0.84 | 0.85 | 0.85 | 0.85 | 0.84 | 0.85 | 0.85 | 0.85 | 0.85 |
| | Material hardness (Shore C) | 64 | 64 | 64 | 64 | 64 | 64 | 64 | 64 | 64 | 64 | 64 | 64 | 64 | 64 |
| | Material hardness (Shore D) | 43 | 43 | 43 | 43 | 43 | 43 | 43 | 43 | 43 | 43 | 43 | 43 | 43 | 43 |
| Material hardness of cover-Material hardness of coating layer (Shore C) | | 63 | 63 | 63 | 63 | 63 | 63 | 63 | 63 | 63 | 63 | 63 | 63 | 63 | 63 |
| | | 1 | 1 | 1 | 1 | 1 | 1 | 1 | 1 | 1 | 1 | 1 | 1 | 1 | 1 |
| Ball | Diameter (mm) | 42.75 | 42.74 | 42.73 | 42.74 | 42.70 | 42.71 | 42.72 | 42.72 | 42.72 | 42.72 | 42.72 | 42.74 | 42.74 | 42.73 |
| | Weight (g) | 45.6 | 45.6 | 45.5 | 45.6 | 45.4 | 45.4 | 45.6 | 45.6 | 45.6 | 45.7 | 45.7 | 45.6 | 45.6 | 45.6 |
| | Deflection (mm) | 3.0 | 3.3 | 3.3 | 3.1 | 3.1 | 3.3 | 2.5 | 2.7 | 3.1 | 3.1 | 3.3 | 2.9 | 2.9 | 3.0 |
| | Surface hardness (Shore C) | 85 | 85 | 85 | 85 | 85 | 85 | 85 | 85 | 85 | 86 | 85 | 84 | 84 | 83 |
| | Surface hardness (Shore D) | 59 | 59 | 59 | 59 | 59 | 59 | 59 | 59 | 59 | 59 | 59 | 58 | 58 | 55 |
| Surface hardness of intermediate layer-encased sphere-Surface hardness of ball (Shore C) | | 12 | 12 | 13 | 12 | 12 | 12 | 12 | 12 | 12 | 12 | 12 | 13 | 13 | 7 |
| Core diameter/Ball diameter | | 0.850 | 0.850 | 0.849 | 0.850 | 0.829 | 0.829 | 0.850 | 0.850 | 0.851 | 0.891 | 0.890 | 0.849 | 0.850 | 0.850 |
| Intermediate layer thickness-Cover thickness (mm) | | 0.18 | 0.21 | 0.21 | 0.20 | 0.28 | 0.28 | 0.20 | 0.20 | 0.18 | 0.66 | 0.65 | 0.20 | 0.20 | 0.44 |

The flight (utility club, I #6, I #8), spin rate on approach shots, feel at impact and durability to repeated impact of each golf ball are evaluated by the following methods. The results are shown in Table 7.

Evaluation of Flight (Utility Club)

A utility club is mounted on a golf swing robot and the distance traveled by the ball when struck at a head speed of 38 m/s is measured and rated according to the criteria shown below. The club used is the JGR HS (2016 model) manufactured by Bridgestone Sports Co., Ltd. In addition, using an apparatus for measuring the initial conditions, the spin rate is measured immediately after the ball is similarly struck.

Rating Criteria
Good: Total distance is 165.0 m or more
NG: Total distance is less than 165.0 m Evaluation of Flight (I #6)

A number six iron (I #6) is mounted on a golf swing robot and the distance traveled by the ball when struck at a head speed of 35 m/s is measured and rated according to the criteria shown below. The club used is the JGR Forged (2016 model) I #6 manufactured by Bridgestone Sports Co., Ltd. In addition, using an apparatus for measuring the initial conditions, the spin rate is measured immediately after the ball is similarly struck.

Rating Criteria
Good: Total distance is 154.0 m or more
NG: Total distance is less than 154.0 m Evaluation of Flight (I #8)

A number eight iron (I #8) is mounted on a golf swing robot and the distance traveled by the ball when struck at a head speed of 35 m/s is measured and rated according to the criteria shown below. The club used is the JGR Forged (2016 model) I #8 manufactured by Bridgestone Sports Co., Ltd. In addition, using an apparatus for measuring the initial conditions, the spin rate is measured immediately after the ball is similarly struck.

Rating Criteria
Good: Total distance is 137.0 m or more
NG: Total distance is less than 137.0 m Evaluation of Spin Rate on Approach Shots A sand wedge is mounted on a golf swing robot and the amount of spin by the ball when struck at a head speed of 15 m/s is rated according to the criteria shown below. An apparatus for measuring the initial conditions is used to measure the spin rate immediately after the ball is struck. The sand wedge used is the TourStage TW-03 (loft, 57°), 2002 model, manufactured by Bridgestone Sports Co., Ltd.

Rating Criteria:
Good: Spin rate is 4,500 rpm or more
NG: Spin rate is less than 4,500 rpm Feel The feel of the ball when hit with a driver (W #1) by amateur golfers having head speeds of 30 to 40 m/s is rated according to the criteria shown below.

Rating Criteria:
Good: Ten or more out of 20 golfers rate the ball as having a soft and good feel
NG: Nine or fewer out of 20 golfers rate the ball as having a soft and good feel Durability to Repeated Impact A driver (W #1) is mounted on a golf swing robot, N=8 sample balls are repeatedly struck at a head speed of 45 m/s, and the average value for all the balls of the number of shots required for a ball to begin cracking is determined. Durability indices for the balls in the respective Examples are calculated relative to an arbitrary value of 100 for the number of shots required for the ball in Example 2 to crack.

Rating Criteria:
Good: Index was 90 or more
NG: Index was less than 90

TABLE 7

| | | Example | | | | | | Comparative Example | | | | | | | |
|---|---|---|---|---|---|---|---|---|---|---|---|---|---|---|---|
| | | 1 | 2 | 3 | 4 | 5 | 6 | 1 | 2 | 3 | 4 | 5 | 6 | 7 | 8 |
| Flight (utility) HS 38 m/s | Spin rate (rpm) | 4,714 | 4,421 | 4,500 | 4,568 | 4,462 | 4,321 | 5,275 | 5,161 | 4,761 | 4,603 | 4,500 | 5,341 | 5,236 | 4,812 |
| | Total distance (m) | 165.1 | 166.1 | 166.3 | 165.6 | 167.4 | 168.2 | 160.6 | 161.3 | 163.6 | 162.8 | 165.1 | 160.1 | 160.8 | 163.5 |
| | Rating | good | good | good | good | good | good | NG | NG | NG | NG | good | NG | NG | NG |
| Flight (I#6) HS 35 m/s | Spin rate (rpm) | 4,557 | 4,326 | 4,382 | 4,441 | 4,471 | 4,337 | 5,122 | 5,008 | 4,585 | 4,442 | 4,280 | 5,253 | 5,131 | 4,658 |
| | Total distance (m) | 154.0 | 154.4 | 154.8 | 154.2 | 155.0 | 156.6 | 151.5 | 151.8 | 154.0 | 155.4 | 152.7 | 151.7 | 152.0 | 153.2 |
| | Rating | good | good | good | good | good | good | NG | NG | good | good | NG | NG | NG | NG |
| Flight (I#8) HS 35 m/s | Spin rate (rpm) | 5,937 | 5,665 | 5,663 | 5,801 | 5,857 | 5,643 | 6,613 | 6,470 | 6,077 | 5,803 | 5,586 | 6,551 | 6,457 | 6,039 |
| | Total distance (m) | 137.2 | 139.1 | 137.6 | 138.2 | 138.2 | 140.3 | 137.3 | 137.6 | 135.1 | 138.4 | 138.9 | 136.7 | 136.8 | 137.6 |
| | Rating | good | good | good | good | good | good | good | good | NG | good | good | NG | NG | good |
| Approach shots (SW) HS 15 m/s | Spin rate (rpm) | 4,903 | 4,829 | 4,819 | 4,866 | 4,930 | 4,860 | 5,114 | 5,065 | 4,985 | 4,841 | 4,748 | 4,963 | 4,964 | 5,056 |
| | Rating | good | good | good | good | good | good | good | good | good | good | good | good | good | good |
| Feel | Rating | good | good | good | good | good | good | NG | good | good | good | good | good | good | good |
| Durability to repeated impact | Rating | good | good | good | good | good | good | good | good | good | NG | NG | good | good | good |

As demonstrated by the results in Table 7, the golf balls of Comparative Examples 1 to 8 are inferior in the following respects to the golf balls according to the present invention that are obtained in Examples 1 to 6.

In Comparative Example 1, the "surface hardness of intermediate layer-encased sphere−core center hardness" value on the Shore C hardness scale is less than 40 and the ball deflection is smaller than 2.7 mm. As a result, the distances traveled by the ball on shots with a utility club and with a I #6 are poor. Also, the ball has a hard feel at impact.

In Comparative Example 2, the "surface hardness of intermediate layer-encased sphere−core center hardness" value on the Shore C hardness scale is less than 40. As a result, the distances traveled by the ball on shots with a utility club and with a I #6 are poor.

In Comparative Example 3, a high-acid ionomer is not included in the resin materials for the intermediate layer and the envelope layer. As a result, the distances traveled by the ball on shots with a utility club and with a I #8 are poor.

The golf ball in Comparative Example 4 has a three-piece structure with no envelope layer. As a result, the durability to repeated impact is poor.

The golf ball in Comparative Example 5 has a three-piece structure with no envelope layer. As a result, the durability to repeated impact is poor.

In Comparative Example 6, surface area A and surface area C calculated from the core hardness profile do not satisfy the condition expressed as "surface area A<surface area C." Moreover, the "surface hardness of intermediate layer-encased sphere−core center hardness" value on the Shore C hardness scale is less than 40. As a result, the distances traveled by the ball on shots with a utility club and with irons are poor.

In Comparative Example 7, the "(surface area E+surface area F)−(surface area A+surface area B)" value calculated from the core hardness profile is smaller than 1.0, the ball does not satisfy the condition expressed as "surface area A<surface area C," and the "surface hardness of intermediate layer-encased sphere−core center hardness" value on the Shore C hardness scale is less than 40. As a result, the distances traveled by the ball on shots with a utility clubs and with irons are poor.

In Comparative Example 8, the surface hardness of the envelope layer-encased sphere is higher that the surface hardness of the intermediate layer-encased sphere and the "surface hardness of intermediate layer-encased sphere−core center hardness" value on the Shore C hardness scale is less than 40. As a result, the distances traveled by the ball on shots with a utility club and with a I #6 are poor.

Japanese Patent Application Nos. 2020-145497 and 2021-041168 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a core, an envelope layer, an intermediate layer and a cover, the core being formed of a rubber composition as one layer, the envelope layer being formed of a resin material as one or more layers and the intermediate layer and cover each independently being formed of a resin material as a single layer, wherein the core has a diameter of from 35.1 to 41.3 mm;

the core has a hardness profile in which, letting Cc be the Shore C hardness at a center of the core, Cm be the Shore C hardness at a midpoint M between the core center and a surface of the core, Cm−2, Cm−4 and Cm−6 be the respective Shore C hardnesses at positions 2 mm, 4 mm and 6 mm inward from the midpoint M, Cm+2, Cm+4 and Cm+6 be the respective Shore C hardnesses at positions 2 mm, 4 mm and 6 mm outward from the midpoint M and Cs be the Shore C hardness at the core surface, and defining the surface areas A to F as follows surface area $A: \frac{1}{2} \times 2 \times (Cm-4-Cm-6)$ surface area $B: \frac{1}{2} \times 2 \times (Cm-2-Cm-4)$ surface area $C: \frac{1}{2} \times 2 \times (Cm-Cm-2)$ surface area $D: \frac{1}{2} \times 2 \times (Cm+2-Cm)$ surface area $E: \frac{1}{2} \times 2 \times (Cm+4-Cm+2)$ surface area $F: \frac{1}{2} \times 2 \times (Cm+6-Cm+4)$, (surface area E+surface area F)−(surface area A+surface area B) has a value of 1.0 or more and surface area A<surface area C<(surface area E+surface area F);

the resin materials making up either or both of the envelope layer and the intermediate layer contain a high-acid ionomer;

the center hardness of the core, surface hardness of the sphere obtained by encasing the core with the envelope layer (envelope layer-encased sphere) and surface hardness of the sphere obtained by encasing the envelope layer-encased sphere with the intermediate layer (intermediate layer-encased sphere) have Shore C hardness relationships therebetween which satisfy the following conditions:

surface hardness of envelope layer-encased sphere<surface hardness of intermediate layer-encased sphere, and (1)

(surface hardness of intermediate layer-encased sphere)−(center hardness of core)≥40; (2)

and the ball has a deflection when compressed under a final load of 1,275 N (130 kgf) from an initial load of 98 N (10 kgf) which is at least 2.7 mm.

2. The golf ball of claim 1, wherein the thickness relationship among the layers satisfies the following condition:

cover thickness<intermediate layer thickness<envelope layer thickness. (3)

3. The golf ball of claim 1, wherein the surface hardnesses of the core and the layer-encased spheres satisfy the following condition:

surface hardness of core<surface hardness of envelope layer-encased sphere<surface hardness of intermediate layer-encased sphere>surface hardness of ball. (1')

4. The golf ball of claim 1, wherein the intermediate layer has a material hardness on the Shore D hardness scale of at least 64.

5. The golf ball of claim 1 wherein the value of (surface hardness of intermediate layer-encased sphere)−(center hardness of core) in formula (2) has an upper limit on the Shore C hardness scale of 53 or less.

6. The golf ball of claim 1, wherein the envelope layer is a single layer.

7. The golf ball of claim 1, wherein the value obtained by subtracting the core center hardness (Cc) from the core surface hardness (Cs), expressed as Cs−Cc, is 20 or more.

8. The golf ball of claim 1, wherein surface areas B to E in the core hardness profile satisfy the following condition:

(surface area $D$+surface area $E$)−(surface area $B$+surface area $C$)≥1.0.

9. The golf ball of claim 1, wherein the resin material making up the intermediate layer contains a high-acid ionomer.

10. A multi-piece solid golf ball comprising a core, an envelope layer, an intermediate layer and a cover, the core being formed of a rubber composition as one layer, the envelope layer being formed of a resin material as one or more layers and the intermediate layer and cover each independently being formed of a resin material as a single layer,
wherein
the core has a diameter of from 35.1 to 41.3 mm;
the core has a hardness profile in which, letting Cc be the Shore C hardness at a center of the core, Cm be the Shore C hardness at a midpoint M between the core center and a surface of the core, Cm−2, Cm−4 and Cm−6 be the respective Shore C hardnesses at positions 2 mm, 4 mm and 6 mm inward from the midpoint M, Cm+2, Cm+4 and Cm+6 be the respective Shore C hardnesses at positions 2 mm, 4 mm and 6 mm outward from the midpoint M and Cs be the Shore C hardness at the core surface, and defining the surface areas A to F as follows surface area $A: \frac{1}{2} \times 2 \times (Cm-4-Cm-6)$ surface area $B: \frac{1}{2} \times 2 \times (Cm-2-Cm-4)$ surface area $C: \frac{1}{2} \times 2 \times (Cm-Cm-2)$ surface area $D: \frac{1}{2} \times 2 \times (Cm+2-Cm)$ surface area $E: \frac{1}{2} \times 2 \times (Cm+4-Cm+2)$ surface area $F: \frac{1}{2} \times 2 \times (Cm+6-Cm+4)$, (surface area E+surface area F)−(surface area A+surface area B) has a value of 1.0 or more and surface area A<surface area C<(surface area E+surface area F);

the intermediate layer has a material hardness on the Shore D hardness scale of at least 65;

the center hardness of the core, surface hardness of the sphere obtained by encasing the core with the envelope layer (envelope layer-encased sphere) and surface hardness of the sphere obtained by encasing the envelope layer-encased sphere with the intermediate layer (intermediate layer-encased sphere) have Shore C hardness relationships therebetween which satisfy the following conditions:

surface hardness of envelope layer-encased sphere<surface hardness of intermediate layer-encased sphere, and (1)

(surface hardness of intermediate layer-encased sphere)−(center hardness of core)≥40; (2)

and the ball has a deflection when compressed under a final load of 1,275 N (130 kgf) from an initial load of 98 N (10 kgf) which is at least 2.7 mm.

* * * * *